United States Patent
Deas et al.

(10) Patent No.: US 7,702,004 B2
(45) Date of Patent: Apr. 20, 2010

(54) SIMULTANEOUS BIDIRECTIONAL DIFFERENTIAL SIGNALLING INTERFACE

(76) Inventors: Alexander Roger Deas, King's Gate Lodge, Dalkeith, Edinburgh (GB) EH22 1ST; Igor Anatolievich Abrosimov, 12-82 Prospect Hoshi-Mina, St. Petersburg (RU) 194356; David Coyne, The Computer House, Dalkeith, Edinburgh (GB) EH22 2NA ( * ) Notice: Subject to any disclaimer, the term of this patent is extended or adjusted under 35 U.S.C. 154(b) by 1000 days.

(21) Appl. No.: 10/730,055

(22) Filed: Dec. 9, 2003

(65) Prior Publication Data

US 2004/0116160 A1 Jun. 17, 2004

Related U.S. Application Data

(63) Continuation-in-part of application No. 10/387,443, filed on Mar. 14, 2003, now abandoned.

(30) Foreign Application Priority Data

Dec. 9, 2002 (GB) .................................. 0228629.2

(51) Int. Cl.
*H04B 1/38* (2006.01)
(52) U.S. Cl. ....................... 375/220; 370/286; 370/289; 370/458; 379/3; 379/406.01; 379/406.05; 455/570; 704/E21.002
(58) Field of Classification Search ................. 327/161, 327/170, 231, 235, 276, 281; 340/202; 370/289; 375/220; 381/66
See application file for complete search history.

(56) References Cited

U.S. PATENT DOCUMENTS 3,988,686 A * 10/1976 Beall et al. .................. 327/241

(Continued)

FOREIGN PATENT DOCUMENTS

EP 0707527 6/1996

(Continued)

OTHER PUBLICATIONS

Chang et al; A CMOS Differential Buffer Amplifier with Accurate Gain and Clipping Control; Jul. 1995, IEEE Journal of Solid State Circuits; pp. 731-735.*

(Continued)

*Primary Examiner*—David C Payne
*Assistant Examiner*—Adolf Dsouza
(74) *Attorney, Agent, or Firm*—Schwabe, Williamson & Wyatt, P.C.

(57) ABSTRACT

Bidirectional differential point to point simultaneous high speed signalling is provided between integrated circuits with highly effective echo canceling. Each integrated circuit comprises a transmitter for transmitting a first signal to another integrated circuit and a receiver for receiving a second signal from the other integrated circuit. The transmitter has an output buffer; a receiver has a receiver buffer and is co-located on the same integrated circuit; and a differential buffer is coupled between the input of the transmitter buffer and the output of the receiver buffer. To increase the quality of receiving the second signal, a third signal adjusted in phase and amplitude is coupled at the output of the receive buffer, so that the echoing of the first signal is canceled. Preferably, the rise time of the third signal is also adjusted.

35 Claims, 35 Drawing Sheets

U.S. PATENT DOCUMENTS

| | | | |
|---|---|---|---|
| 4,072,830 A | 2/1978 | Gitlin et al. | |
| 4,393,494 A | 7/1983 | Belforte et al. | |
| 4,458,165 A * | 7/1984 | Jackson | 327/276 |
| 4,549,048 A * | 10/1985 | Combier | 370/289 |
| 4,644,178 A | 2/1987 | Michalik | |
| 4,755,984 A * | 7/1988 | Ambrosio et al. | 370/286 |
| 4,977,551 A * | 12/1990 | Minami et al. | 369/44.25 |
| 4,991,166 A * | 2/1991 | Julstrom | 370/288 |
| 4,993,045 A | 2/1991 | Alfonso | |
| 5,278,567 A * | 1/1994 | Nourrcier | 342/202 |
| 5,334,891 A * | 8/1994 | Marbot | 327/281 |
| 5,422,950 A | 6/1995 | Miller et al. | |
| 5,528,687 A | 6/1996 | Tanaka et al. | |
| 5,559,841 A * | 9/1996 | Pandula | 375/375 |
| 5,726,592 A * | 3/1998 | Schulte et al. | 327/65 |
| 5,742,201 A * | 4/1998 | Eisenberg et al. | 330/2 |
| 5,787,114 A * | 7/1998 | Ramamurthy et al. | 375/221 |
| 5,790,335 A * | 8/1998 | Sugawara et al. | 360/68 |
| 5,896,420 A | 4/1999 | Kaku et al. | |
| 6,078,356 A * | 6/2000 | Jensen | 348/164 |
| 6,100,716 A * | 8/2000 | Adham et al. | 326/68 |
| 6,166,573 A * | 12/2000 | Moore et al. | 327/161 |
| 6,246,716 B1 * | 6/2001 | Schneider | 375/220 |
| 6,259,680 B1 * | 7/2001 | Blackwell et al. | 370/286 |
| 6,278,785 B1 * | 8/2001 | Thomasson | 381/66 |
| 6,304,106 B1 | 10/2001 | Cecchi et al. | |
| 6,320,867 B1 * | 11/2001 | Bellenger et al. | 370/420 |
| 6,362,672 B1 * | 3/2002 | Geist | 327/170 |
| 6,404,255 B1 * | 6/2002 | Filliman et al. | 327/231 |
| 2002/0070783 A1 * | 6/2002 | Saeki | 327/235 |
| 2004/0109496 A1 | 6/2004 | Deas | |
| 2004/0116160 A1 | 6/2004 | Deas | |

FOREIGN PATENT DOCUMENTS

| | | |
|---|---|---|
| GB | 2253771 | 9/1992 |
| GB | 2308283 | 6/1997 |
| WO | WO-01/16702 | 3/2001 |
| WO | 2004053927 | 6/2004 |

OTHER PUBLICATIONS

Office Action of U.S. Appl. No. 10/387,443 mailed Jun. 14, 2006.

Search Report of Great Britain Application No. 228629.2 dated Aug. 29, 2003.

Search Report of PCT Application No. PCT/RU03/00530 mailed Sep. 1, 2004.

Search Report of PCT Application No. PCT/RU04/00490 mailed May 30, 2005.

* cited by examiner

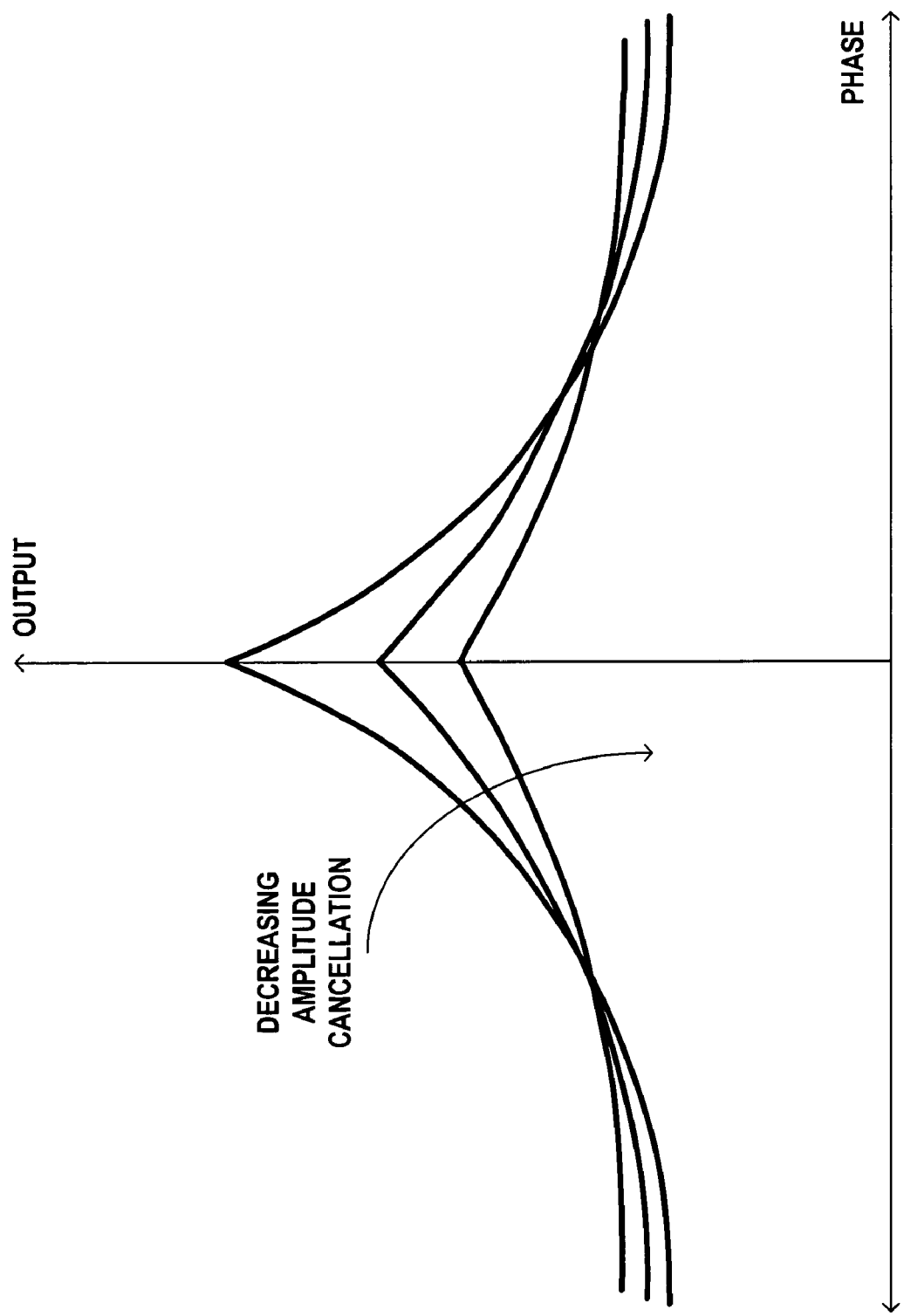

SIMULTANEOUS BIDIRECTIONAL DIFFERENTIAL SIGNALLING INTERFACE

CROSS-REFERENCE TO RELATED APPLICATIONS

This application is a continuation-in-part of U.S. patent application Ser. No. 10/387,443 filed Mar. 14, 2003, which claims priority from United Kingdom Patent Application 0228629.2 filed Dec. 9, 2002.

BACKGROUND OF THE INVENTION

1. Technical Field

The present invention relates to high speed interfaces using differential signalling for communicating data between integrated circuits.

2. Background of the Invention

Point to point differential signalling is preferred for the communication of very high speed signals between integrated circuits. Such signalling provides significant benefits to the systems integrator and the integrated circuit designer, including reduced ground and power current injection, reduced EMI from the balanced differential lines, a large improvement in common mode noise immunity, and provides a basis to reduce number of power and ground pins compared with single ended signalling. The drawback of differential signalling compared to single ended signalling is that for every signal path, two wires are required. Neglecting the power and ground connections, a simple comparison of the pin and wire count between a differential signalling solution and a single ended signalling solution, such as JEDEC DDR 2, is unfavourable unless the differential solution operates at more than twice the data rate of the single ended solution.

A single ended bus uses tri-state drivers, so data can be transmitted in both directions across a single set of signal wires, with the data separated in time (time division multiplexing of the wire resource). This further improves the efficiency in terms of wire and pin count of the single ended solution. However, the bidirectional time division of the single ended bus requires a gap between the turnaround, such as between read and write operations, or read and command operations.

A differential point to point solution requires no turn around time, as each direction has dedicated wire resources.

Summarising this comparison, a byte wide single ended tristate bus sending 800 Mbps per wire, will require 8 signal pins plus typically 8 power and ground pins. A contemporary differential bus may send the same bandwidth of 6.4 Gbps (800 Mbps×8), across a differential pair in each direction. The total wire count is 4 signal wires, plus 4 power and ground pads. If the data rate is only 3.2 Gbps, the wire count for the same bandwidth as the single ended bus is identical, and below 3.2 Gbps, the wire count is higher.

Simultaneous bidirectional signalling across a differential wire pair is well known: telephone systems have been doing this for over 100 years. In a modern telephone system the return signal is removed using echo cancellation, and in the case of conference telephones, bidirectional echo cancellation. These systems use a hybrid circuit comprising transformers or an analogue network of resistors and operational amplifiers to extract the signal for the loudspeaker and inject the signal from the microphone into wire pair. With the introduction of digital signal processing, the echo cancellation in these telephony systems was implemented using an adaptive filter. In the telephony system, the echo cancellation tries to remove far end echo: significant near end echo is desirable so the user can hear himself—otherwise the user feels the line is dead. For modems, complete cancellation is desirable, and this is accomplished using a large signal processing budget. All these methods, from the simplest transformers up to the adaptive signal processors are impractical for digital systems communicating at very high speed.

A telephony hybrid circuit is shown in FIG. 2, comprising a microphone 1, 2 at each end of the differential channel 30, 31, and a loudspeaker 5 and 6. The microphone and loudspeaker are coupled into the channel by a transformer 7 and 8, and resistors such as 3 and 4. The loudspeaker responds only to currents injected into the channel, the microphone picking up a portion of this signal. The level of cancellation of this circuit is inadequate for the applications under consideration in this invention, and moreover at very high speeds, transformers operate across a narrow frequency band, which makes them unsuitable for sending data unless encoded, this coding reduces significantly the data payload of the channel. Improved passive versions of this hybrid circuit exist, but still provide around −18 dB of coupling between the channel directions which is insufficient rejection for the present application.

At very high speed, amplifiers have very low gain which makes them unsuitable for integration into devices for high speed channels, where significant gain is required to operate with the resistor networks such as is used in extracting the signal in each direction in the telephony system.

A very large number of high performance echo cancelling systems are known and many of these can provide very high levels of rejection between channels, but these need to operate at a multiple of the highest frequency in the channel: the sampling alone must be at least twice the maximum frequency in the channel that is being rejected. For high speed channels, such fast processors and their analogue to digital converters do not exist, nor can they ever exist because the signal processor needs to send data to and from memory a number of times for each sample and it is the connector of the processor to the memory that is a primary application of the present invention.

Echo cancelers have been used to minimize the effects of echo distortion in communication systems susceptible to echo systems including full-duplex, two-wire telecommunication systems. Echo cancelers in these and other systems operate by subtracting a replica of the echo of the original signal from the received signal. Examples of such apparatus is disclosed in U.S. Pat. No. 6,259,680 wherein the computational overhead associated with echo cancellation in a data communications system is reduced by utilizing symmetrical information rates at asymmetrical signal rates.

The design of a differential signalling system where both data for both directions is communicated on the same wires through time division multiplexing of the drivers is also well known, such as using tristate LYDS drivers and in RS485. Such an RS485 system provided by Maxim Integrated Products, Inc. (CA) is shown in FIG. 3, where two chips communicate across a differential channel 30, 31, each with their own electro-static discharge circuits (18, 19 and 28, 29). The transmit buffers 11, 12 (and 21, 22) may be implemented using parts such as a Maxim integrated circuit part number Maxim 3460 and Maxim 3461. Full duplex operation is provided by having multiple channels, with some channels operating in one direction and some in another, or half duplex operation is supported by using the device enable pins to put the drivers and or receivers into a high impedance state so the other side of the channel can drive the wire resource. The parts Maxim 3463 and Maxim 3464 are designed specifically for this mode of operation using time domain multiplexing of the wire resource, and is shown in Maxim data sheets as well as in very many other documents.

The data rate of such systems is much lower than for the applications contemplated here, such as at 20 MBps for the Maxim parts compared to 6 Gbps and above for the present invention, but the principles could be applied without undue difficulty by persons skilled in the art of high speed signalling at high speeds.

Object of the Present Invention

It is a primary object of the present invention to reduce the wire count in a bidirectional differential signalling channel by a factor of two by enabling both directions to use the same pair of wires simultaneously, that is without time division multiplexing.

It is a further object of the present invention to reduce the number of bonding pads and the area required for bonding pads in a integrated circuit using differential signalling.

It is a further object of the present invention to maintain bidirectional signalling without sacrifice of transfer rate from time division multiplexing of the wire resource between different directions.

It is further object of the present invention to share the Electro-Static Discharge protection circuitry between transmitters and receivers.

It is further object of the present invention to reduce the power consumption by reducing the energy used in the terminators for signalling in both directions.

A particular form of the invention is suitable for memory to processor interfaces, high speed network interfaces and ASIC to ASIC interfaces.

BRIEF SUMMARY OF THE INVENTION

In one aspect of the present invention an integrated circuit for point to point simultaneous bidirectional differential high speed signalling to another integrated circuit connected thereto, the integrated circuit comprising:
  a transmitter for transmitting a first signal to another integrated circuit; the transmitter having an output buffer;
  a receiver for receiving a second signal from the other integrated circuit, the receiver having a receiver buffer and co-located on the same integrated circuit; and
  a differential buffer coupled between the input of the transmitter buffer and the output of the receiver buffer;
  wherein the first signal at the output of the transmitter buffer is coupled into the input of the receiver buffer; and a third signal at the input of the transmitter buffer is coupled into the differential buffer and on to the output of the receiver buffer;
  wherein the differential buffer adjusts the third signal in phase and amplitude to cancel the first signal at the output of the receiver buffer, whereby the quality of receiving the second signal is enhanced by canceling echoing of the first signal.

Preferably, the characteristics of the differential buffer, such as the gain and phase, are adjusted to achieve the maximum signal cancellation in the receiving buffer.

Preferably also, the differential buffer further adjusts the rise time of the third signal to match the rise time of the first signal.

The differential buffer can be arranged as a plurality of stages, so that one or more buffer stage in a cancellation path can be disabled with the effect that the first signal is passed to the receiver for testing purposes.

The differential buffer can be implemented in N-type FET transistors to minimise the parasitic capacitance.

The gain of the differential buffer can be varied by means of a finite state machine using a pattern following power up or on request. The finite state machine employs a peak detector and means of reading a parameter related to the peak detector to set a value through digital to analogue converters which controls the currents sources in the differential stages in the chain of buffers providing the second signal between transmitter and receiver.

In another aspect of the invention, a method for point to point simultaneous bidirectional differential high speed signalling over the comminication media is provided, where the signalling is from one integrated circuit connected to another integrated circuit, each circuit comprising a transmitter having an output buffer and a receiver having a receiver buffer; the method comprising:
  transmitting a first signal from the output buffer of the transmitter arranged on one integrated circuit, to another circuit, the first signal being coupled also into the input buffer of the receiver co-located with the transmitter on the same integrated circuit;
  receiving a second signal from the other integrated circuit;
  transmitting a third signal from the input of the transmitter buffer to a differential buffer where the third signal is adjusted in phase and amplitude; and
  coupling the adjusted third signal onto the output of the receiving buffer to cancel the first signal, whereby the quality of receiving the second signal is enhanced by canceling echoing of the first signal.

Preferably also, the rise time of the third signal is adjusted to match the rise time of the first signal.

Still in one more aspect, an apparatus is provided for point to point simultaneous bidirectional differential high speed signalling between integrated circuits, the apparatus comprising an integrated circuit connected to another integrated circuit, each integrated circuit comprising:
  a transmitter for transmitting a first signal to another integrated circuit; the transmitter having an output buffer;
  a receiver for receiving a second signal from the other integrated circuit, the receiver having a receiver buffer and co-located on the same integrated circuit;
  a differential buffer coupled between the input of the transmitter buffer and the output of the receiver buffer; and
  a state machine for controlling the differential buffer in gain and phase;
  wherein the first signal at the output of the transmitter buffer is coupled into the input of the receiver buffer; and
  a third signal at the input of the transmitter buffer is passed through the differential buffer and is coupled onto the output of the receiver buffer;
  wherein the differential buffer adjusts the third signal in phase and amplitude to cancel the first signal at the output of the receiver buffer, whereby the quality of receiving the second signal is enhanced by canceling echoing of the first signal.

Preferably, the differential buffer further adjusts the rise time of the third signal to match the rise time of the first signal.

BRIEF DESCRIPTION OF THE SEVERAL VIEWS OF THE DRAWINGS

For a better understanding of the present invention and the advantages thereof and to show how the same may be carried into effect, reference will now be made, by way of example, without loss of generality to the accompanying drawings in which:

FIG. 9c shows a transfer function of the phase cancellation sensor with incomplete amplitude cancellation.

DETAILED DESCRIPTION OF THE INVENTION

The invention will now be described in detail without limitation to the generality of the present invention with the aid of example embodiments and accompanying drawings.

Figure 1:
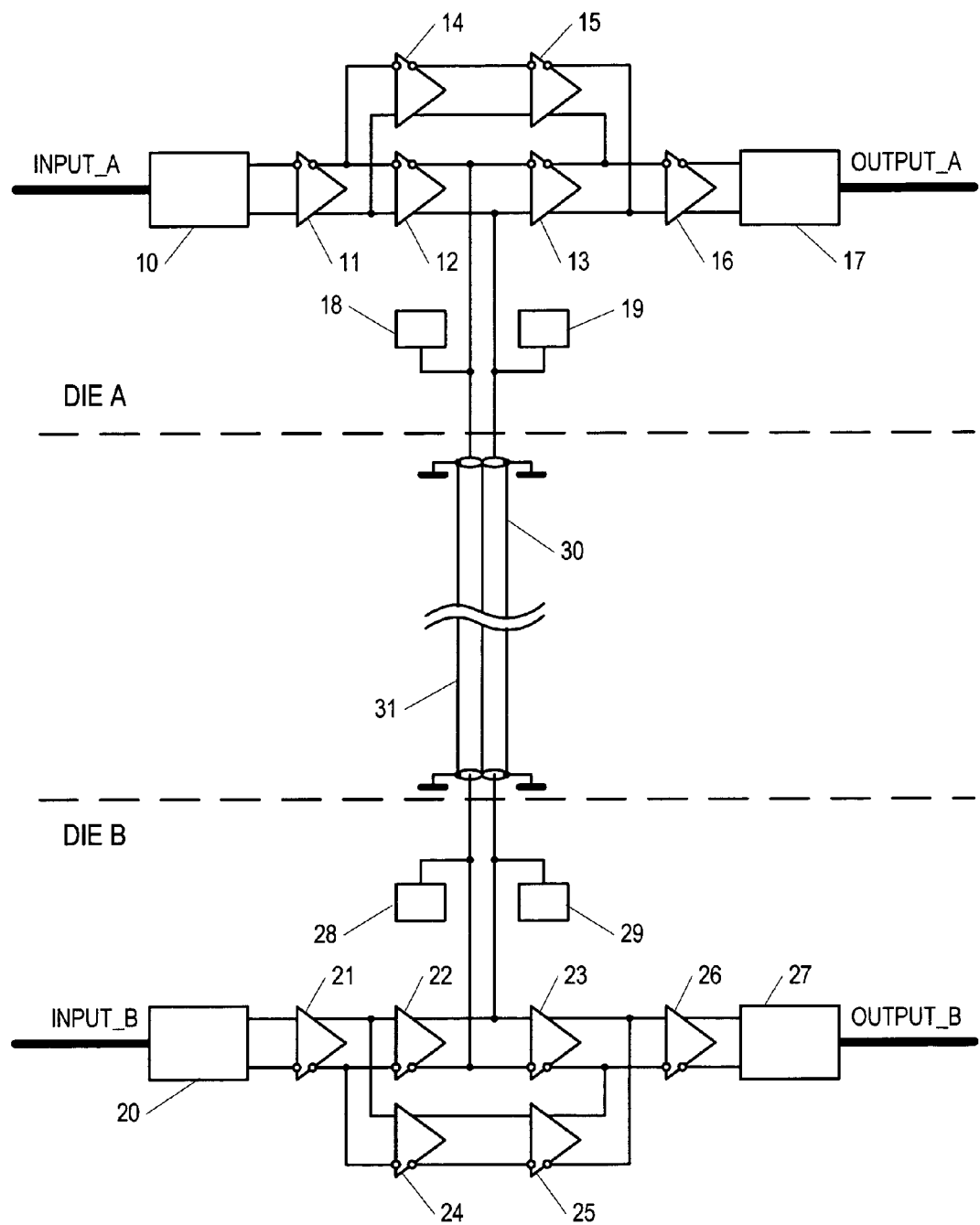
FIG. 1 shows a simultaneous bidirectional signalling system according to the present invention.
Figure 2:
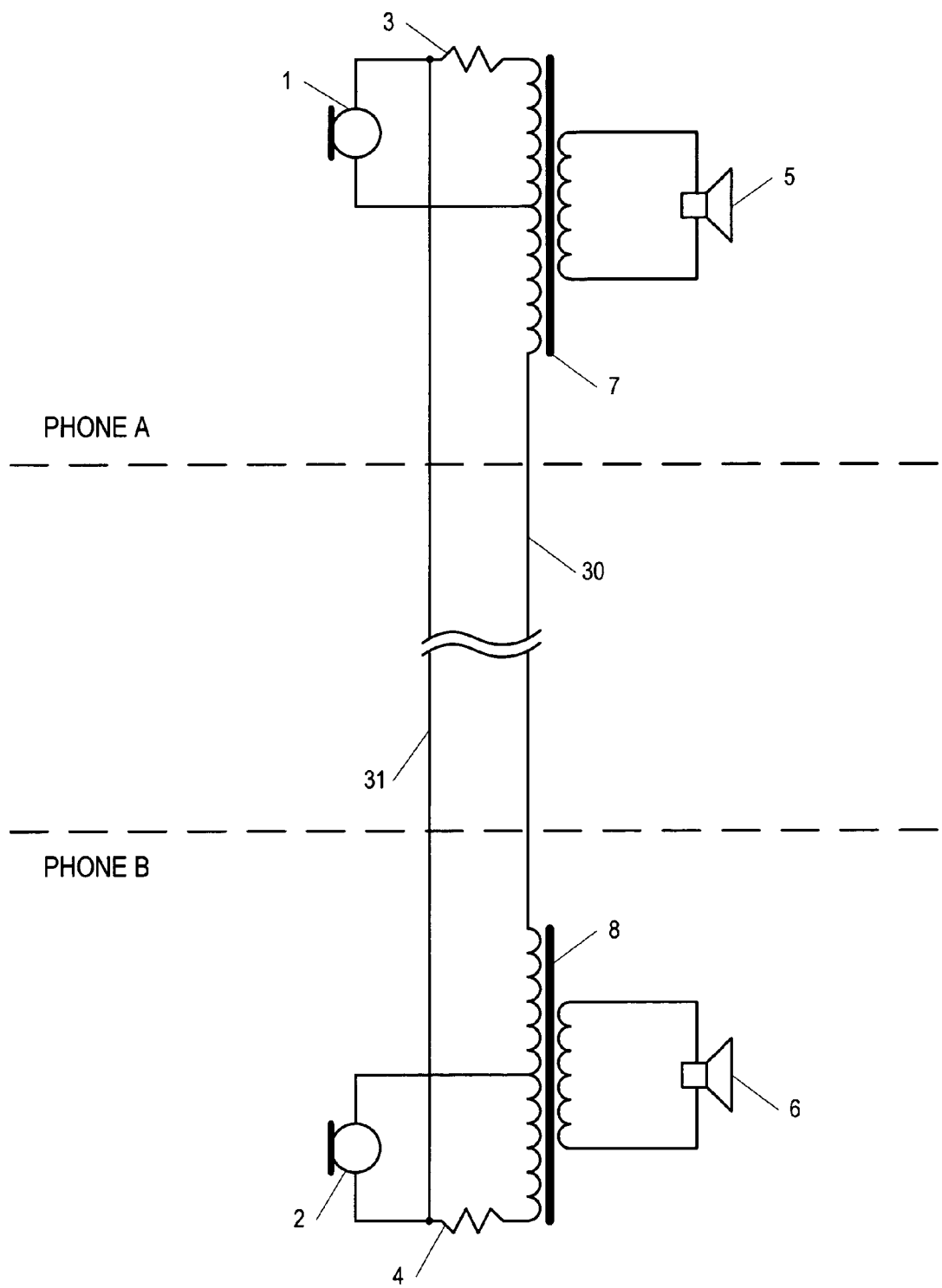
FIG. 2 shows a prior art simultaneous bidirectional signalling system for telephony applications.
Figure 3:
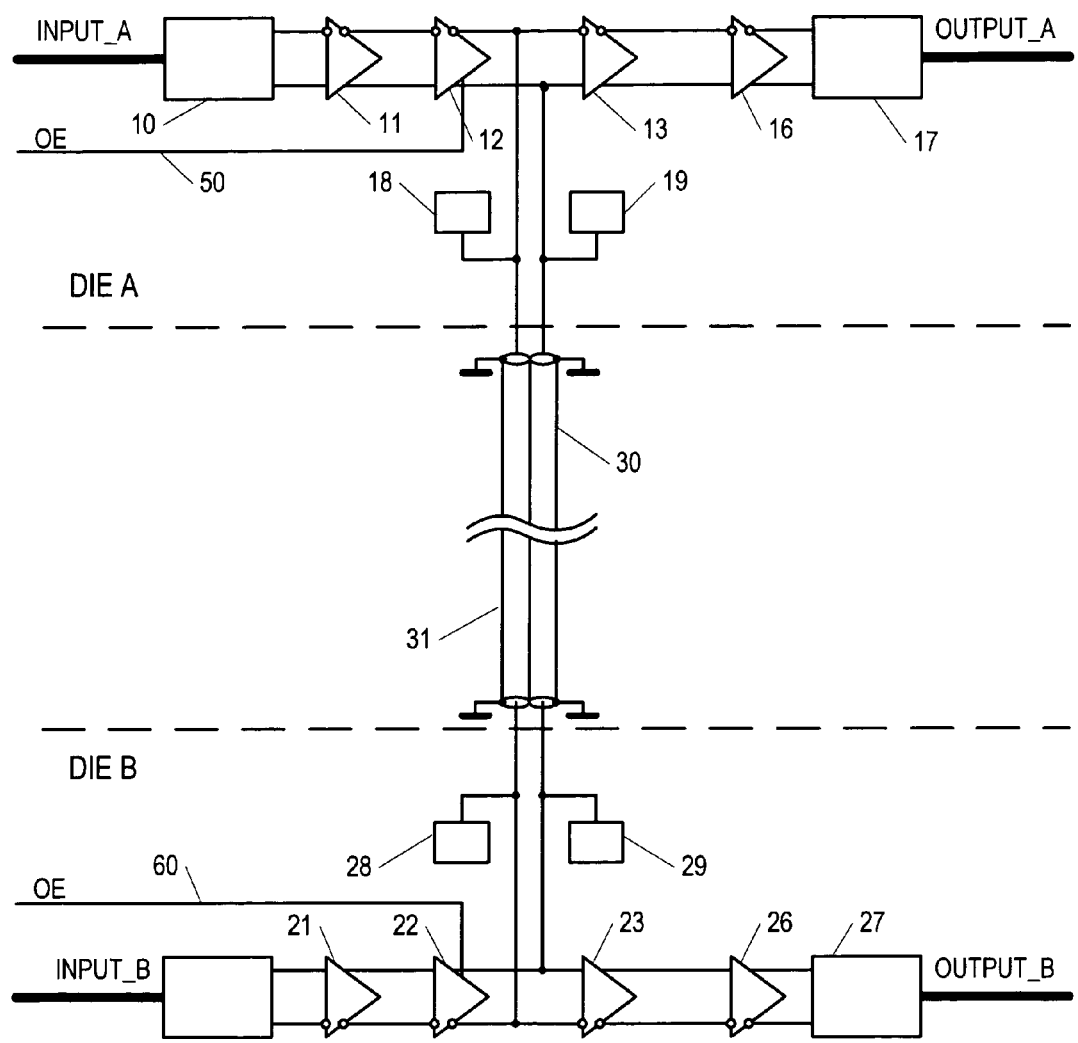
FIG. 3 shows a prior art bidirectional signalling system using time division multiplexing of the wire resource.

FIG. 1 shows a differential channel, with a pair of signal wires, 30 and 31, connecting two dies, Die A and Die B in a point to point connection. Each die has the same circuit, comprising for Die A, an ESD structure on each wire, 18 and 19, and input buffers 13 and 16 each of which would normally comprising a chain of buffers, which may include integral Miller capacitance compensation and integral signal emphasis or other conditioning. On the same die, an input bus A is serialised by serialiser 10 which may also include other circuits such as verniers, phase or pulse modulating circuits, and then drives a first high speed signal through differential driver stages, 11 and 12, each of which normally comprises a chain of buffers and preferably includes signal pre-emphasis and is preferably structured to compensate for Miller capacitance.

A first signal is transmitted from Die A to Die B and a second signal is transmitted from Die B to Die A. A third signal, which is a copy of the first signal in the drive chain, is taken and applied to the receive chain, via a buffer, 14 and 15, such that the polarity and/or phase of this third signal applied to the receive chain is the opposite to the polarity of the first transmit signal that is coupled into the receive chain, 13 and 16, by virtue of the receiver input 13 being connected to the driver output 12. Where this third cancelling signal exactly matches the amplitude and phase of the first coupled signal, while the polarity is opposite, then none of the output transmit signal appears on the output of the receiver buffer 16. The output of buffer 16 therefore represents only the signal received from Die B, without any component from the signal transmitted by Die A.

The nature of the coupling of the transmit signal into the receive channel is that the coupled signal appears as non-common mode noise in the receive channel, therefore must be cancelled, as the differential stages have a high rejection only of common mode noise. Typically the receive channel will be insensitive to non-common mode (differential) noise below 10 mV, and the transmit signal will have an amplitude of several hundred mV, such as 350 mV. Therefore the cancelling circuit must be typically of 5 bit or more accuracy.

Figure 5:
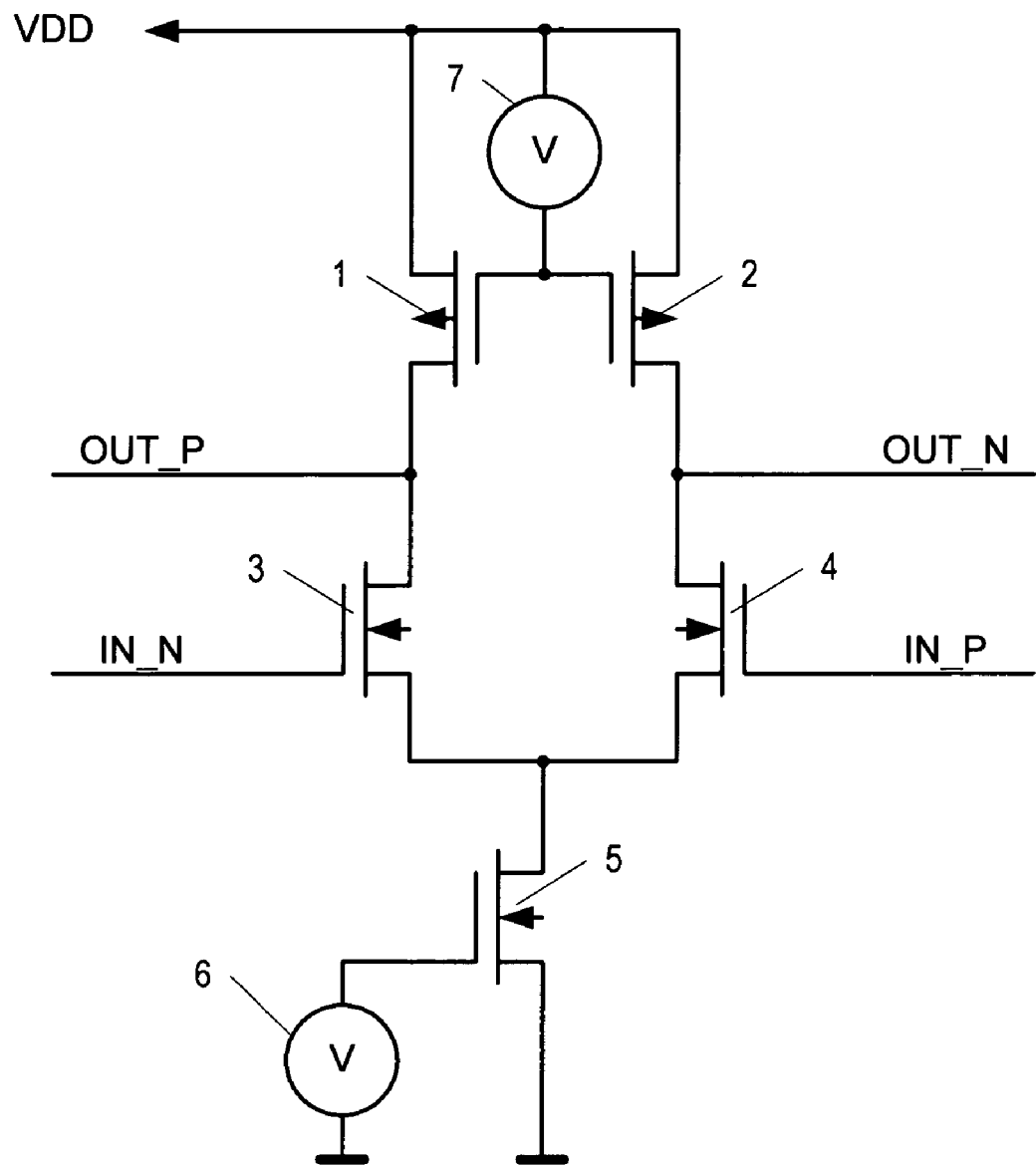
FIG. 5 shows a differential stage for the regulated amplifier in FIGS. 1 and 4.

Each of the buffers of FIG. 1 (11, 12, 13, 14, 15 and 16), can be of the form shown in FIG. 5, where a differential input signal, IN_N and IN_P is amplified to give a differential output signal OUT_P and OUT_N respectively, by amplifying transistors 3, and 4, with their sources connected to a current source such as is formed by an N type transistor with a voltage source 6 driving its gate, and the load, preferably formed by transistors 1 and 2 with a voltage source 7 driving their gate. The gain through the stage can be varied by variation of the voltage sources driving the different gates, to adjust the gain and the phase shift of the signal being fed forward to nullify the coupling of the transmitter output to the receiver chain.

Figure 4:
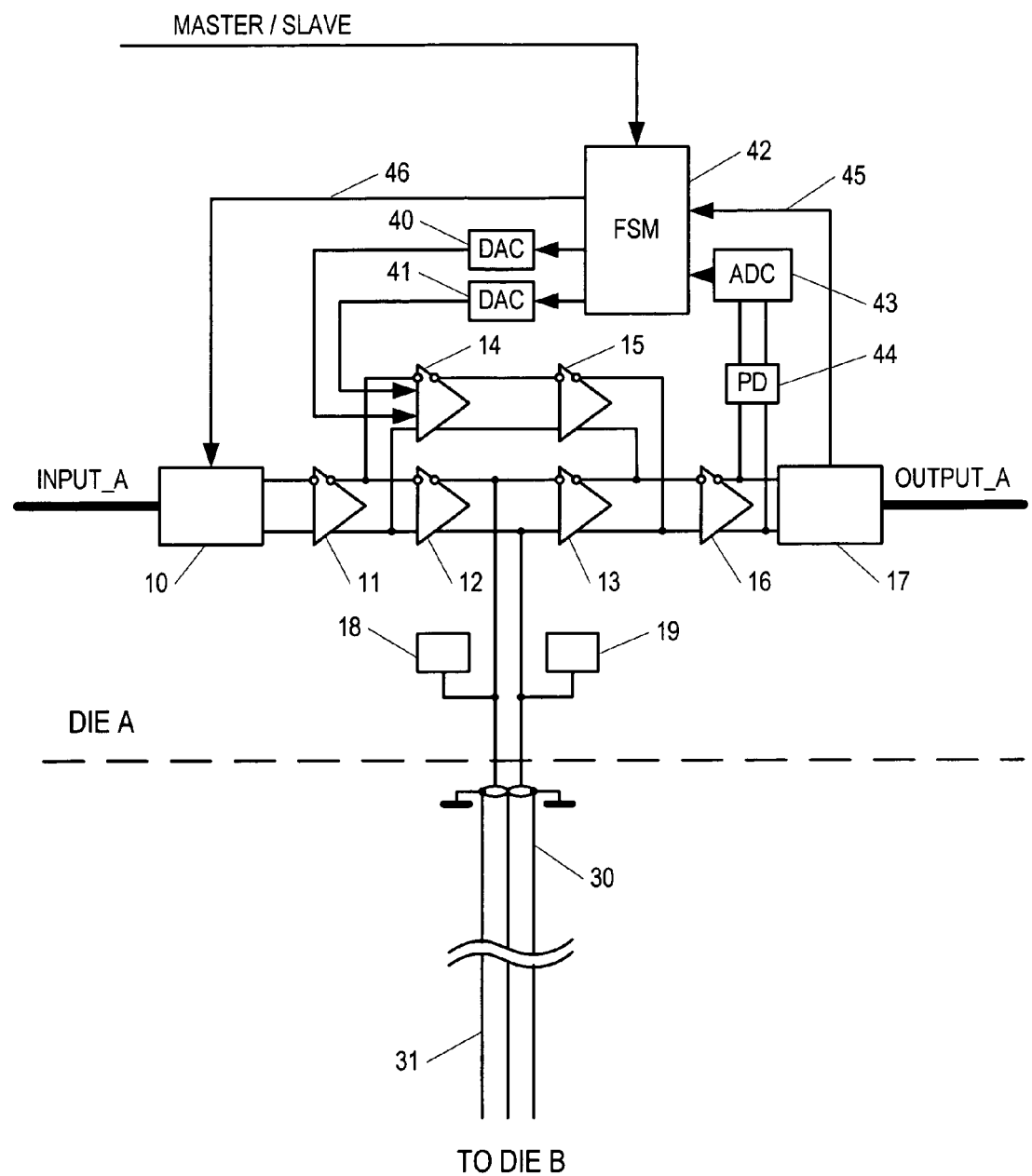
FIG. 4 shows an improved echo cancellation system in digital form suitable for high speed binary data transfer according to the present invention.

FIG. 4 shows a means by which the proportion of the cancelling signal can be determined and applied. This comprises the same circuit elements with the same labels as in FIG. 1, but with the addition of a peak detector 44, driving a circuit 43 which converts the amplitude of the output of the peak detector 44 to a digital form, this being applied to a state machine 42, which drives two digital to analogue converters, 40 and 41, to set the two voltage sources shown in FIG. 5. In some applications, the modulation of only one voltage source may be possible, depending on the detailed design of the differential stage, the transistor characteristic, the voltage headroom and the load device. In a viable but non-preferred implementation the load device may be simply a resistor implemented in polysilicon which is unable to be modulated, leaving only the current source providing a common sink current as the gain control means. In this case, the phase of the signal must be determined by careful circuit analysis and may be established statically. The preferred implementation controls both voltage sources (that is, controls all current sources).

The finite state machine (FSM) 42 in FIG. 4 operates as follows. Upon power up or shortly thereafter, the FSM sends a training pattern into the channel by introducing a signal 46 into the transmitter chain. The FSM then varies the amplitude of the signal into the DACs 40 and 41. The finite state machine determines the codes in the DACs which corresponds to the minimum peak to peak noise by using a peak detector 44 and ADC 43. At the end of adjustment process the determined codes are applied to the DACs. During this search to establish a null signal with optimum gain and phase, the second Die, Die B, is quiet, it acting as a slave.

After the master has been configured, the slave Die goes through a similar sequence. The configuration of which is the master and which is the slave can be set by control bits that are normally found in communication channels to control various aspects of the mode of operation. This control bit, shown as a Master/Slave signal, in FIG. 4 normally is provided by a register. Die B may time out to determine the duration of the procedure in Die A, or may listen to the channel to observe when the channel is quiet following activity following power up. In this listen mode, Die B transmitter is inactive. This time out can be implemented using counters incorporated into the FSM 42, which for omitted from the diagrams to maintain their clarity.

The output impedance of the buffers 12 and 22 in FIG. 1 should preferably match the line.

The finite state machine should preferably have a control from a register enabling it to switch off the signal path through the buffers 14 and 15 in FIG. 4, to enable a complete internal loop back of the transmit signal to the receive path, for the purposes of device testing.

Figure 6:
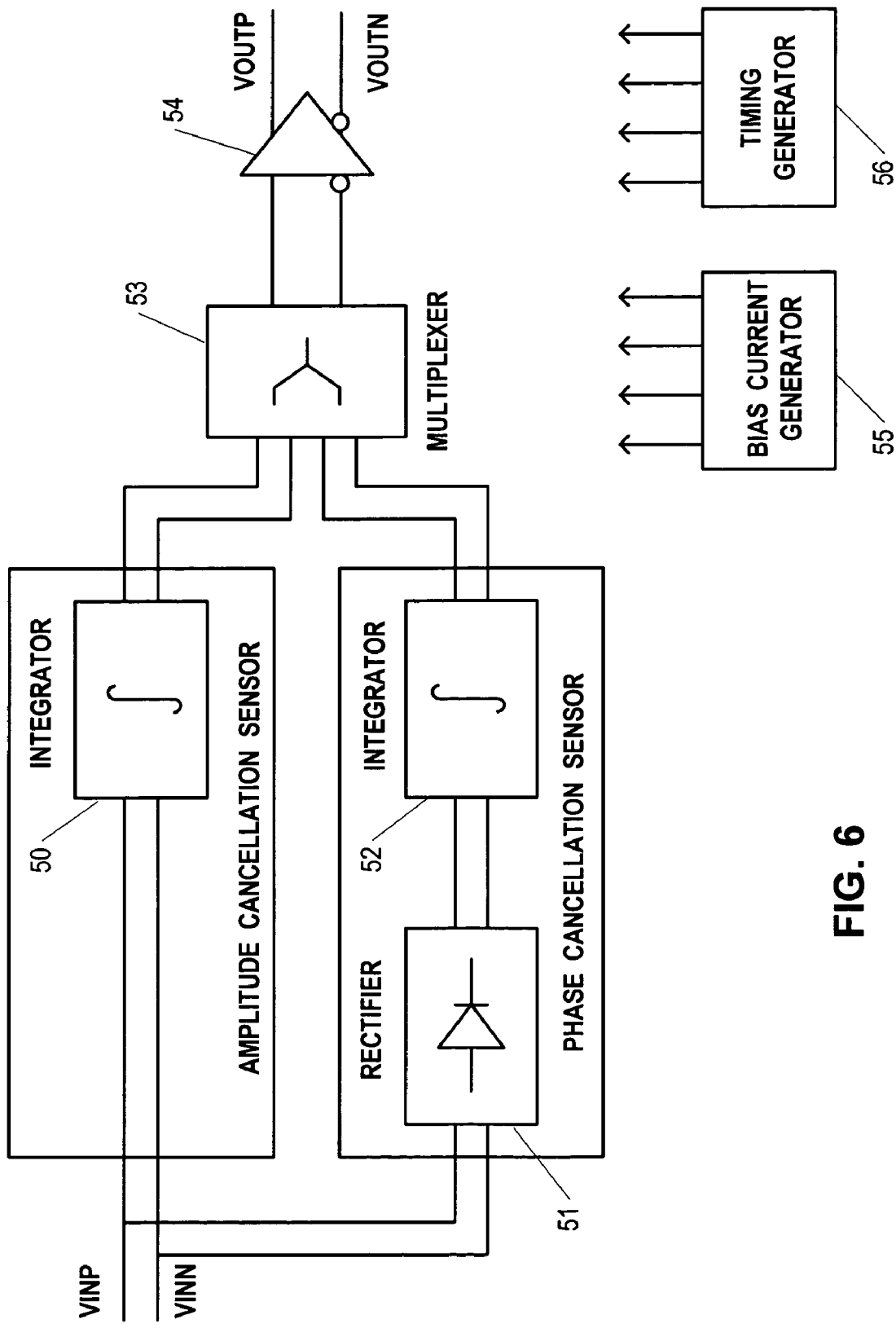
FIG. 6 shows a diagram of the dual integrator amplitude and phase cancellation sensors.

Another embodiment of a circuit as an alternative to the Peak Detector 44 is now described. The circuit depicted in FIG. 6 senses the amount of gain and phase cancellation. FIG. 6 shows the signal split into two paths. The upper path is passed through an integrator 50 producing an output which is directly related to the amount of amplitude cancellation. The lower path passes through a rectifier 51, the output of which is then integrated by integrator 52 producing an output which is proportional to the amount of phase cancellation. The outputs of the integrators 50 and 51 are passed through a multiplexer 53 to an output buffer 54, which drives the ADC 43. The multiplexer is controlled by a signal from the FSM 42 which selects the output from one of the integrators to be connected to the ADC 43. Bias and timing control blocks 55 and 56 are included which are under control of the FSM 42 enhancing the sensitivity and also allowing other calibration techniques. Gain and phase cancellation are performed separately in this embodiment although in another embodiment multiple ADC's may be used to measure the gain and phase cancellation at the same time.

Figure 7A:
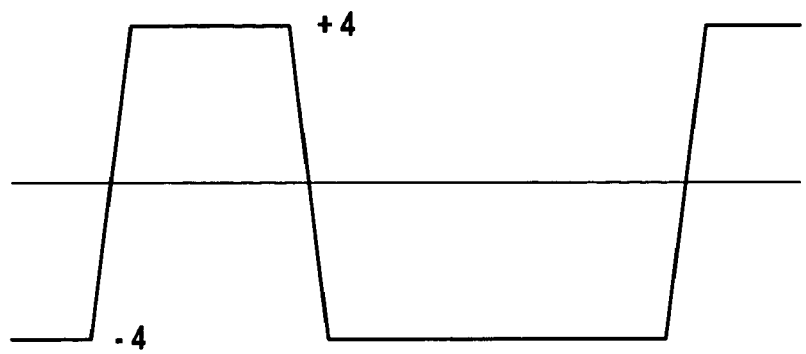
FIG. 7a, b and c shows timing diagrams relating to the operation of the amplitude cancellation sensor.
Figure 7B:
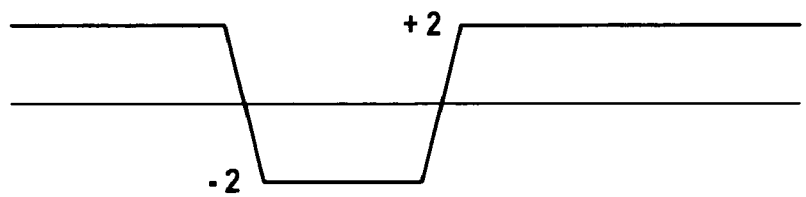
FIG. 7d, e and f shows timing diagrams relating to the operation of the phase cancellation sensor.
Figure 7C:
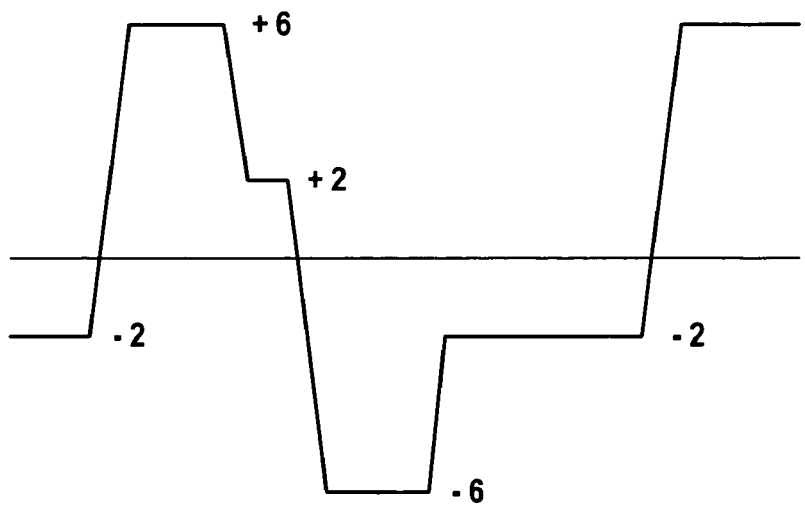

To explain the above dual integrator scheme, reference is first made to the timing diagrams in FIGS. 7a, 7b and 7c. FIGS. 7a, 7b and 7c show binary waveforms relating to the signals in the channel during calibration. These signals are the output of the transmit buffer, the output of the cancellation amplifier and the residual signal from summing of the two afore-mentioned signals respectively. The pattern applied to the channel has a mark to space ratio which is not unity. In this embodiment the mark to space ratio is 1:3. It should be noted that other patterns with different mark to space ratio's and number of levels have characteristics which would work with the circuits in this embodiment.

It can be observed that the waveform of the incompletely cancelled signal in FIG. 7c has certain characteristics which may be exploited with different types of sensors which may be used to provide information on the degree of amplitude or phase cancellation. An amplitude cancellation sensor may be formed by integrating the signal in FIG. 7c. A signal which does not have a mark to space ratio of unity contains a dc content and this characteristic is to be used in the amplitude cancellation sensor. An embodiment of such an integrator is shown in FIG. 8a and its transfer function, the output voltage versus the cancellation signal amplitude, is shown in FIG. 9a.

Figure 7D:
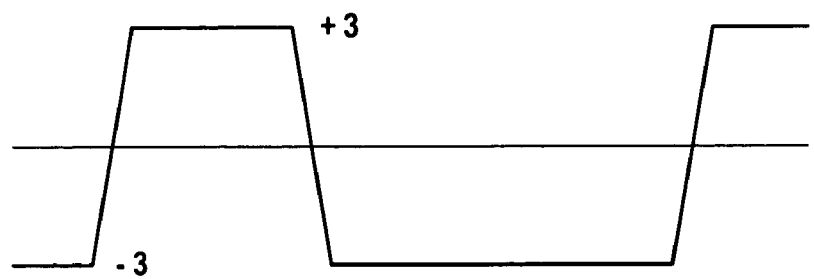
Figure 7E:
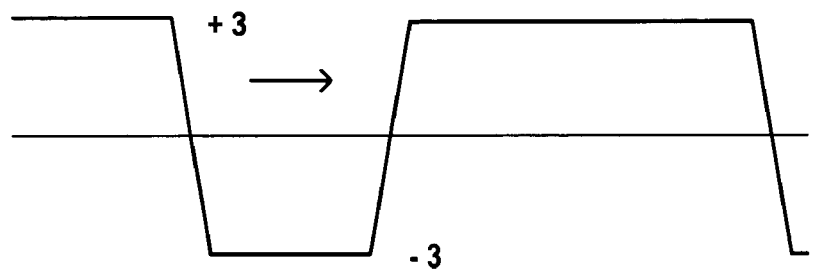
Figure 7F:
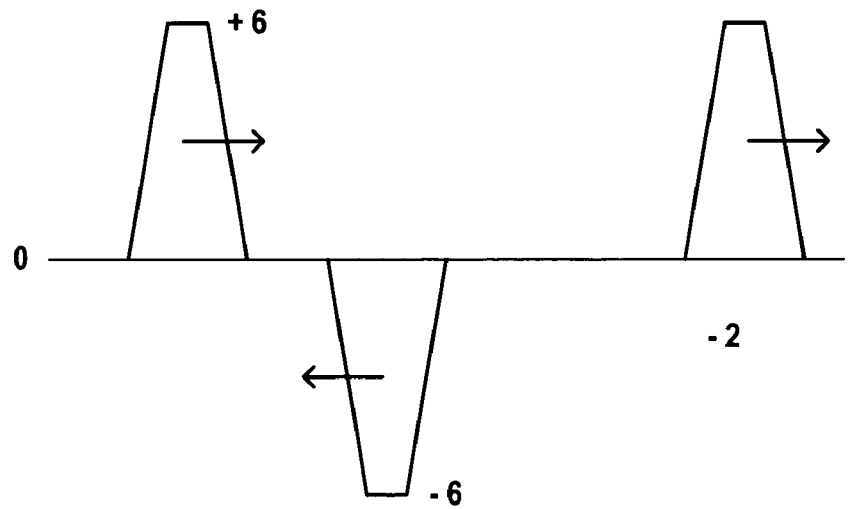
Figure 8B:
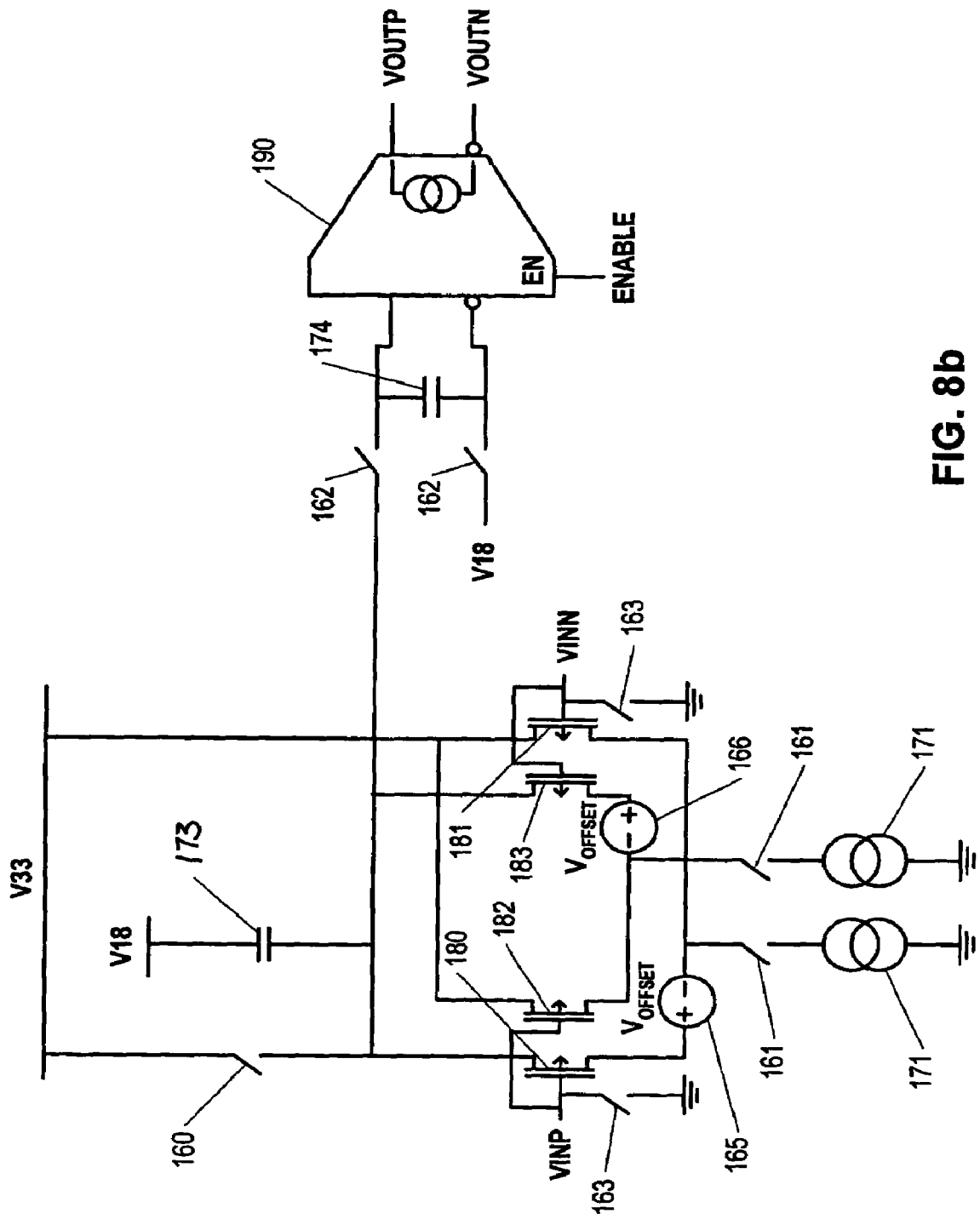
FIG. 8b shows a phase cancellation sensor with a full-wave rectifying integrator, sample and hold device and buffer.
Figure 9A:
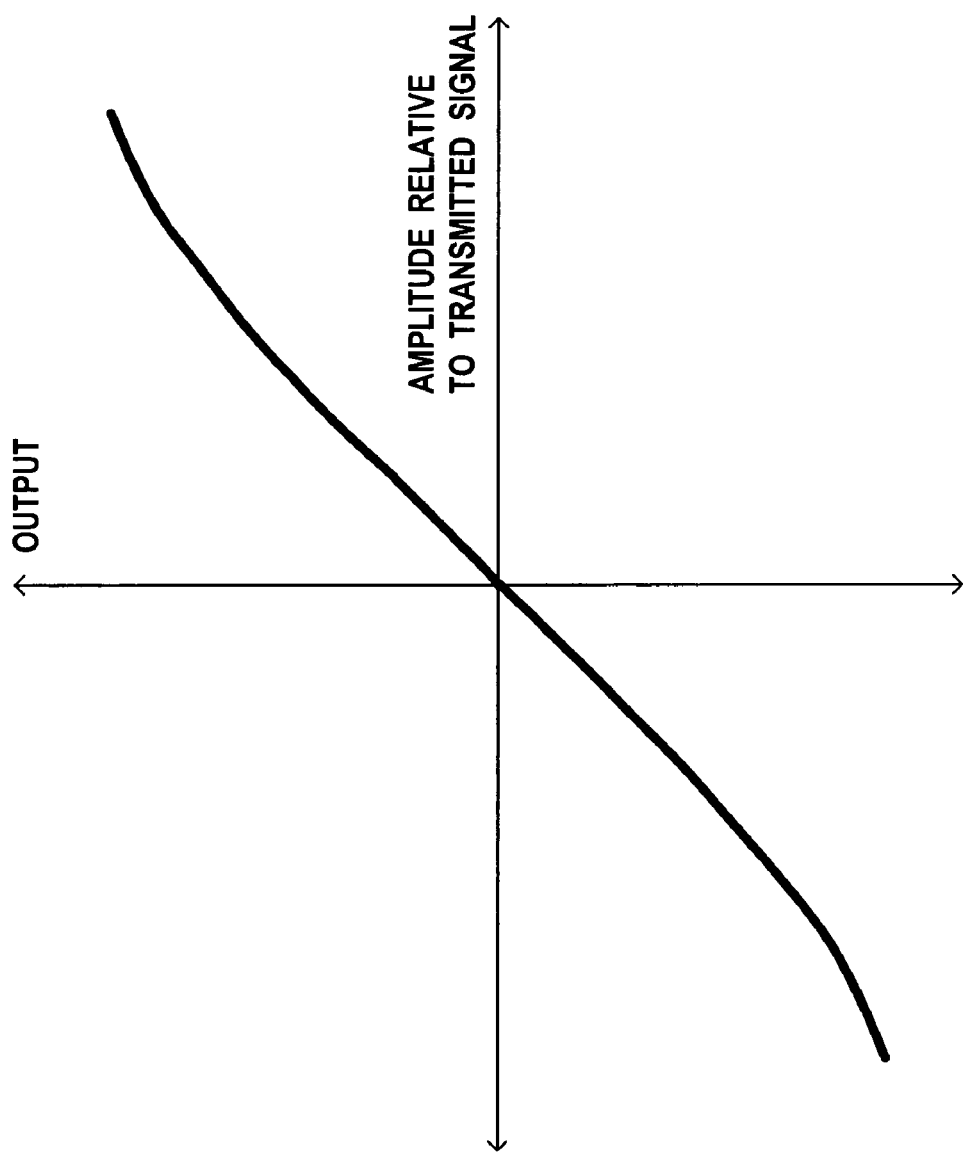
FIG. 9a shows a transfer function of the amplitude cancellation sensor.
Figure 9B:
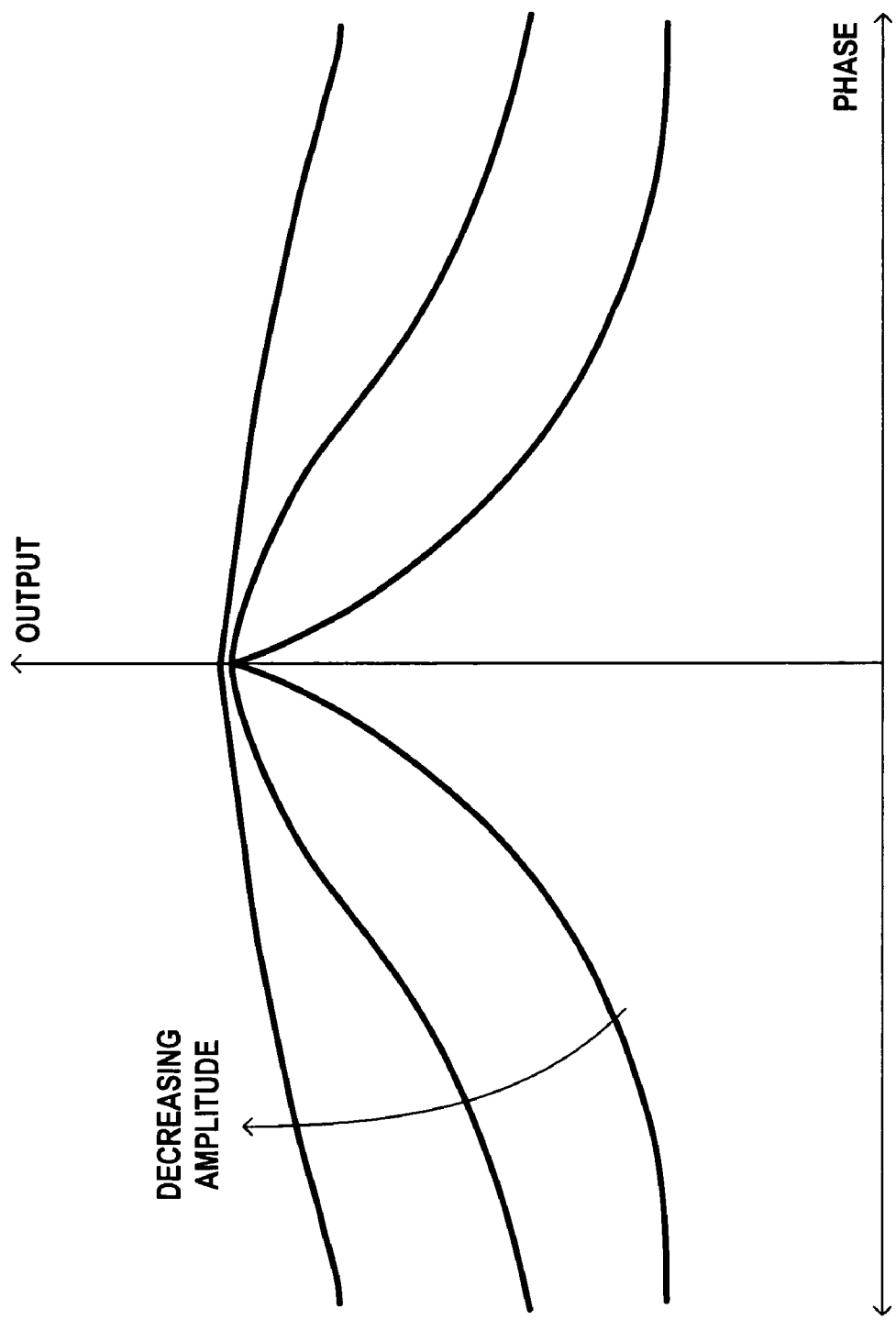
FIG. 9b shows a transfer function of the phase cancellation sensor.

In a similar manner it can be seen that for a residual signal in the channel as depicted in FIGS. 7d and 7e, where the amplitude has been cancelled but the phase has not been cancelled, a half-wave or full-wave rectifier followed by an integrator can produce a phase cancellation sensor. FIGS. 7d and 7e show two different phase cancellation conditions. An embodiment of such a sensor is shown in FIG. 8b and the transfer function of the sensor is shown in FIG. 9b.

It can be clearly seen that although a binary signal with a mark to space ratio of 1:3 has been used in this embodiment, the techniques are clearly applicable to signals of multiple levels and/or different mark to space ratios and/or different patterns.

Figure 8A:
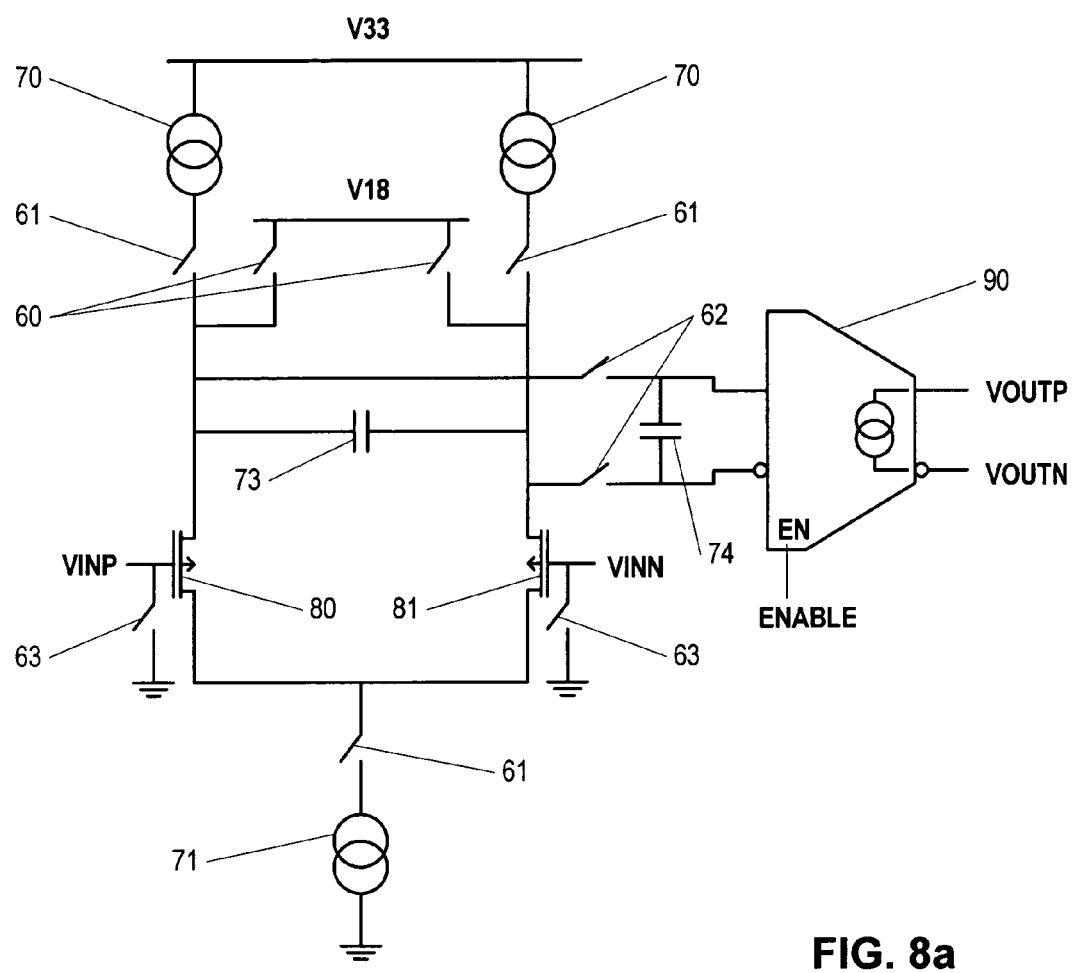
FIG. 8a shows an amplitude cancellation sensor with integrator, sample and hold and buffer.

FIG. 8a is now described.

The amplitude cancellation sensor is formed by an integrator, a sample and hold device and output transconductance amplifier or buffer. Transistors 80 and 81 form a differential pair with current sources 70 and 71 providing the biasing for the differential pair. The residual signal from the channel is applied to the gates of transistors 80 and 81 which produces a differential output current at the drains of the same transistors. This current flows into the integrating capacitor 73 and produces a voltage across that same capacitor. The charge stored in the integrating capacitor 73 at the end of the integration period is shared with any charge in the sample and hold capacitor 74 during the transfer period, yielding an output voltage relative to the degree of amplitude cancellation.

Switches 60, 61, 62 and 63 control the different phases of the integrator operation. There are three phases in this design, a reset phase, an integration phase and a transfer phase. A cycle is formed by a reset phase followed by an integration phase which is followed in turn by a transfer phase. The whole cycle repeats continuously throughout the cancellation calibration period. The length of each of these phases is generally significantly-longer than the period of the pattern in order to ensure that integration of an incomplete cycle of the residual waveform does not generate an inaccurate result. In this embodiment the switches are formed by NMOS or PMOS transistors or both NMOS and PMOS transistors.

In the reset phase switches 60 are closed and each end of the integrating capacitor 71 is connected to supply V18. Switches 61 are open, removing the bias currents from the differential pair, 80 and 81. Switches 62 are open, leaving the sample and hold capacitor, 74, in the hold mode. Switches 63 are closed connecting the gates of transistors 80 and 81 to ground turning off the differential pair.

In the integration phase switches 60, 62 and 63 are opened. The input voltage applied across the gates of transistors 80 and 81 produces a differential current which flows in capacitor 73 and a differential voltage across the capacitor 74.

In the transfer phase switches 60 are open, switches 61, 62 and 63 are closed. The transistors 80 and 81 are forced off by the removal of bias current and clamping of the gate voltages. Capacitors 73 and 74 are now connected in parallel and charge is shared between these two capacitors. The voltage across the capacitors is dependent on the value of each capacitance and the initial voltages across each capacitor. However, after multiple cycles, the voltage on both capacitors will become asymptotic to the voltage on integrating capacitor 73 at the end of the integration phase. In this embodiment the capacitors are of equal size and it requires that the integrator repeat the integration/transfer phase 6 times to achieve an accuracy of 1%. More cycles result in higher accuracy.

Figure 10A:
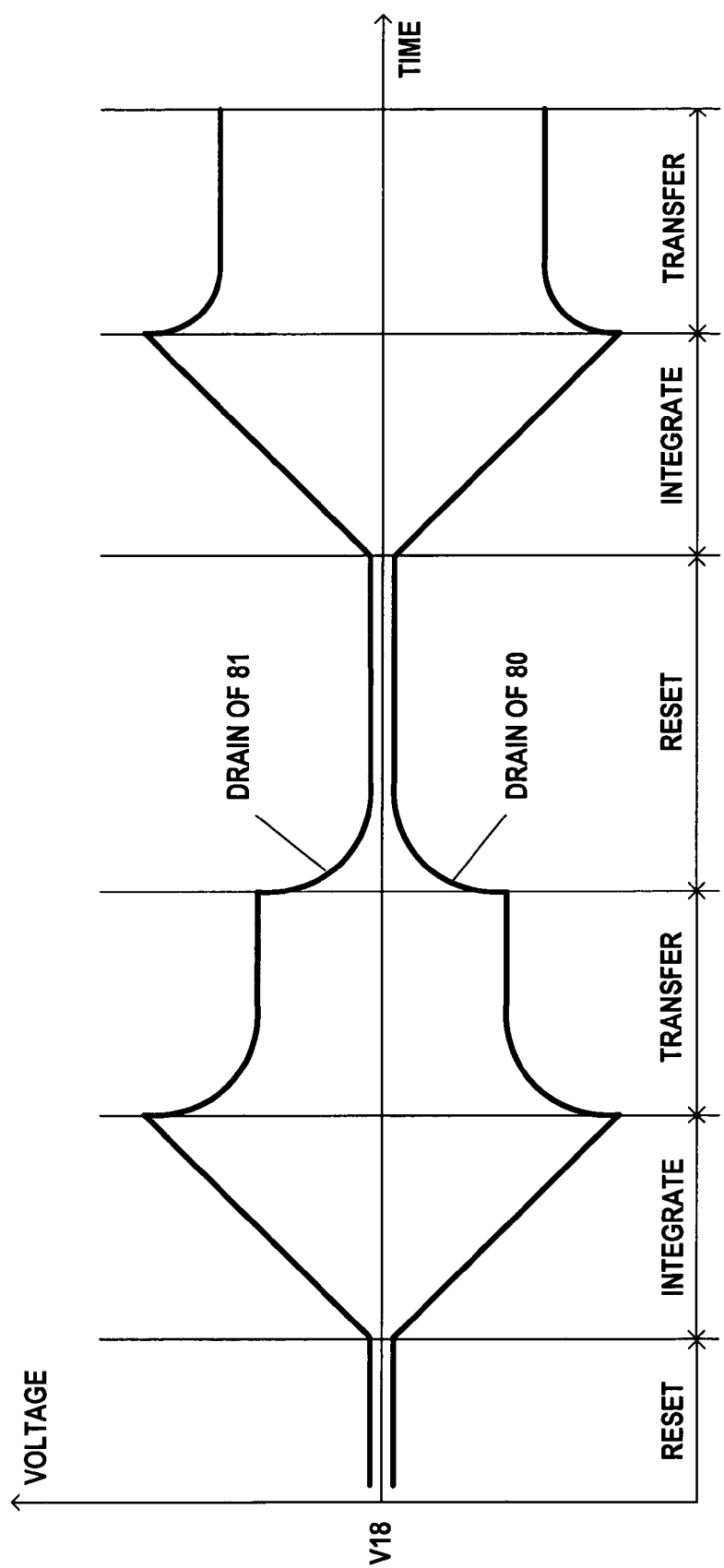
FIG. 10a, b, c and d show waveforms relating to points in the amplitude and phase cancellation sensor circuits.
Figure 10B:
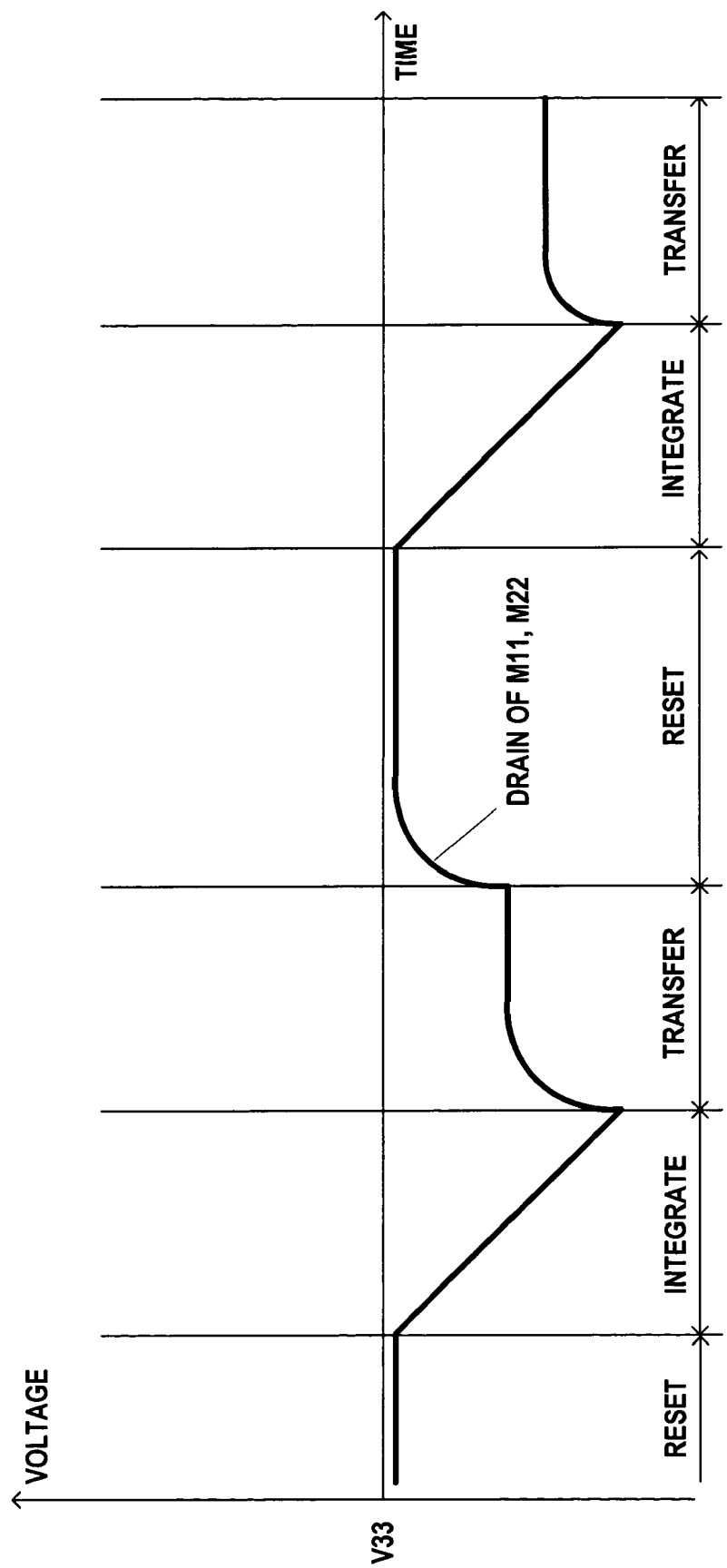
Figure 10C:
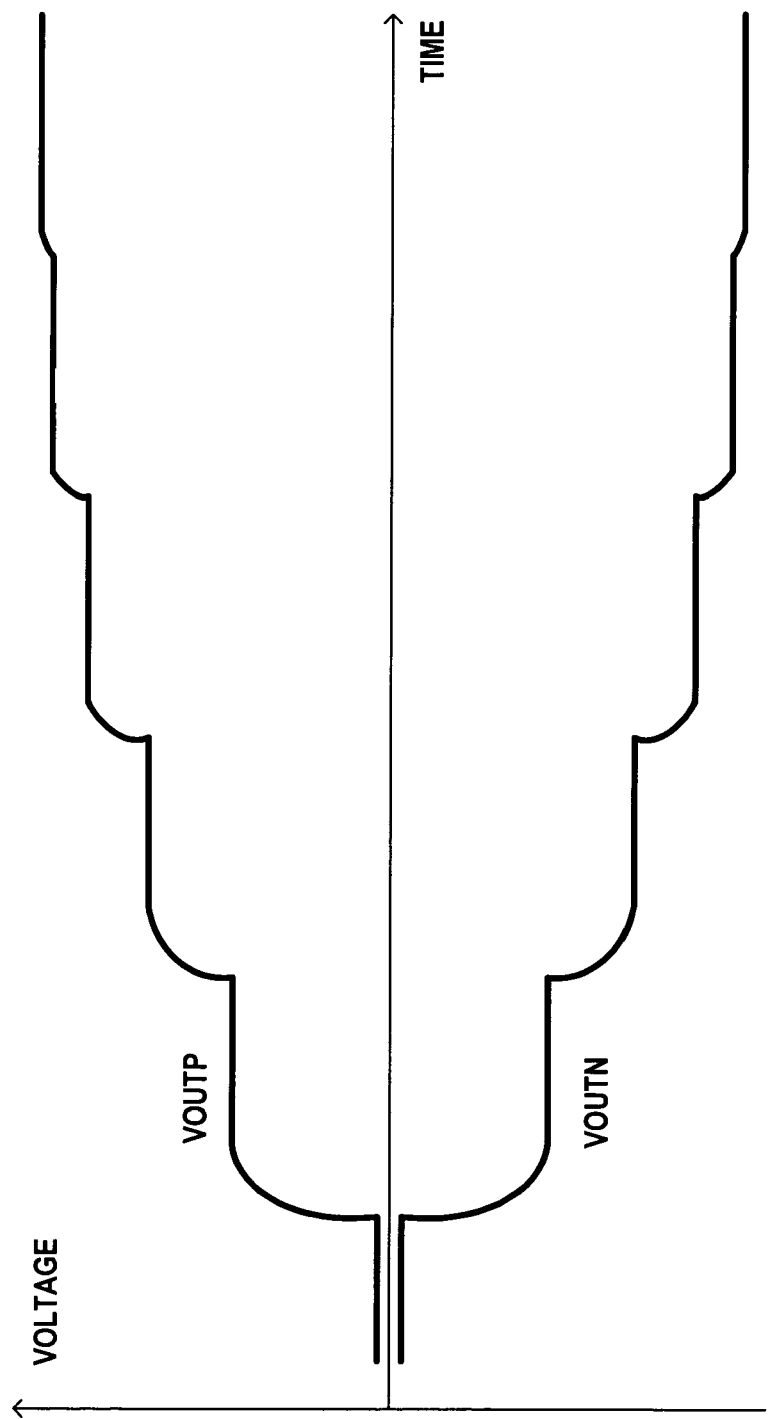
Figure 10D:
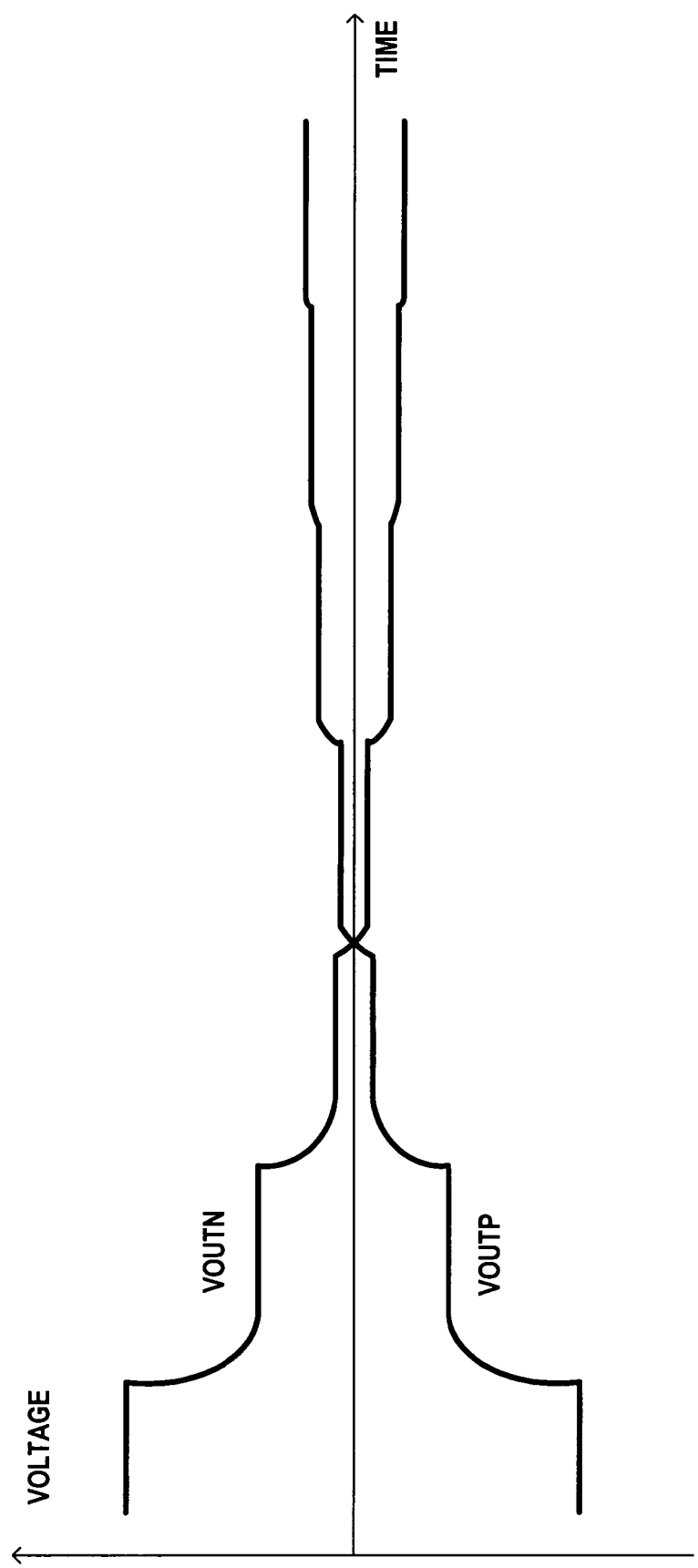

Typical waveforms in this circuit are shown in FIG. 10a. The waveforms show the voltage at the drain of transistors 80 and 81. The linear ramp region is the integration phase. These waveforms show the first integration cycle where there is no voltage on capacitor 74. During the transfer phase the charge stored in capacitor 73 is shared with capacitor 74 and the voltage drops by a factor of two. During the second transfer phase capacitor 74 has a charge equal to half that on capacitor 73 so that at the end of the second transfer phase the voltage across capacitors 73 and 74 is three-quarters of the final voltage. On each transfer phase the voltage at the end of the transfer phase is incremented by half of the difference between the voltage across capacitors 73 and 74 at the beginning of the transfer phase. The waveforms in FIG. 10c show the output of the complete amplitude cancellation sensor circuit from the first cycle. In this waveform it can be clearly seen that the differential output voltage starts at zero and increase at the transfer phase of each cycle becoming close to a static value after a small number of cycles.

In another embodiment it is possible to place a differential voltage buffer between the integrating capacitor 73 and the sample and hold comprising of switches 62 and capacitor 74 such that the charge sharing did not occur. This would allow the output voltage to be obtained after just one integration cycle.

The voltage across the sample and hold capacitor 74 is fed to a differential buffer 90 and routed through a multiplexer 53 and buffer 54 to the ADC 43.

Figure 11A:
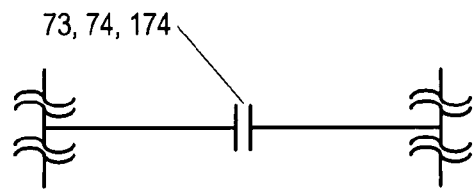
FIG. 11a and b shows the implementation of the integrating and sample and hold capacitors.
Figure 11B:
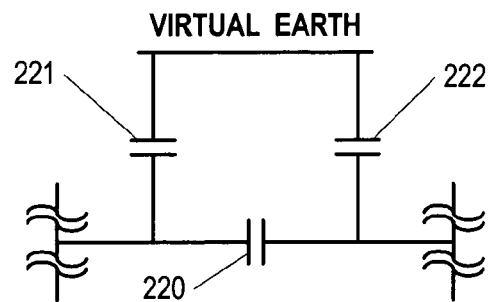

The capacitors 73 and 74 are implemented as shown in FIG. 11. A combination of differential and common mode capacitance is used in order to minimise voltage excursions due to mismatches in the circuit components and charge feedthrough effects.

Offsets within the amplitude cancellation sensor circuit are handled, firstly, by accurate matching of the current sources 70 and 71 plus traditional layout techniques and sizing of transistors 80 and 81. Secondly, a calibration routine is performed as the first step in the amplitude cancellation algorithm which is described later.

Figure 12:
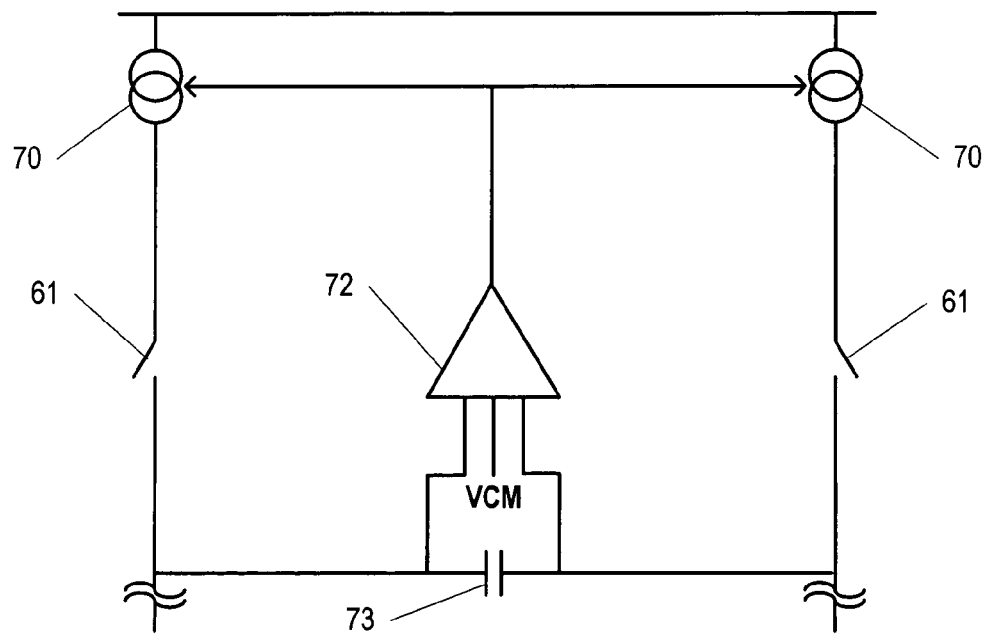
FIG. 12 shows a diagram of a common mode feedback loop to remove common mode offsets in the amplitude cancellation sensor.
Figure 13A:
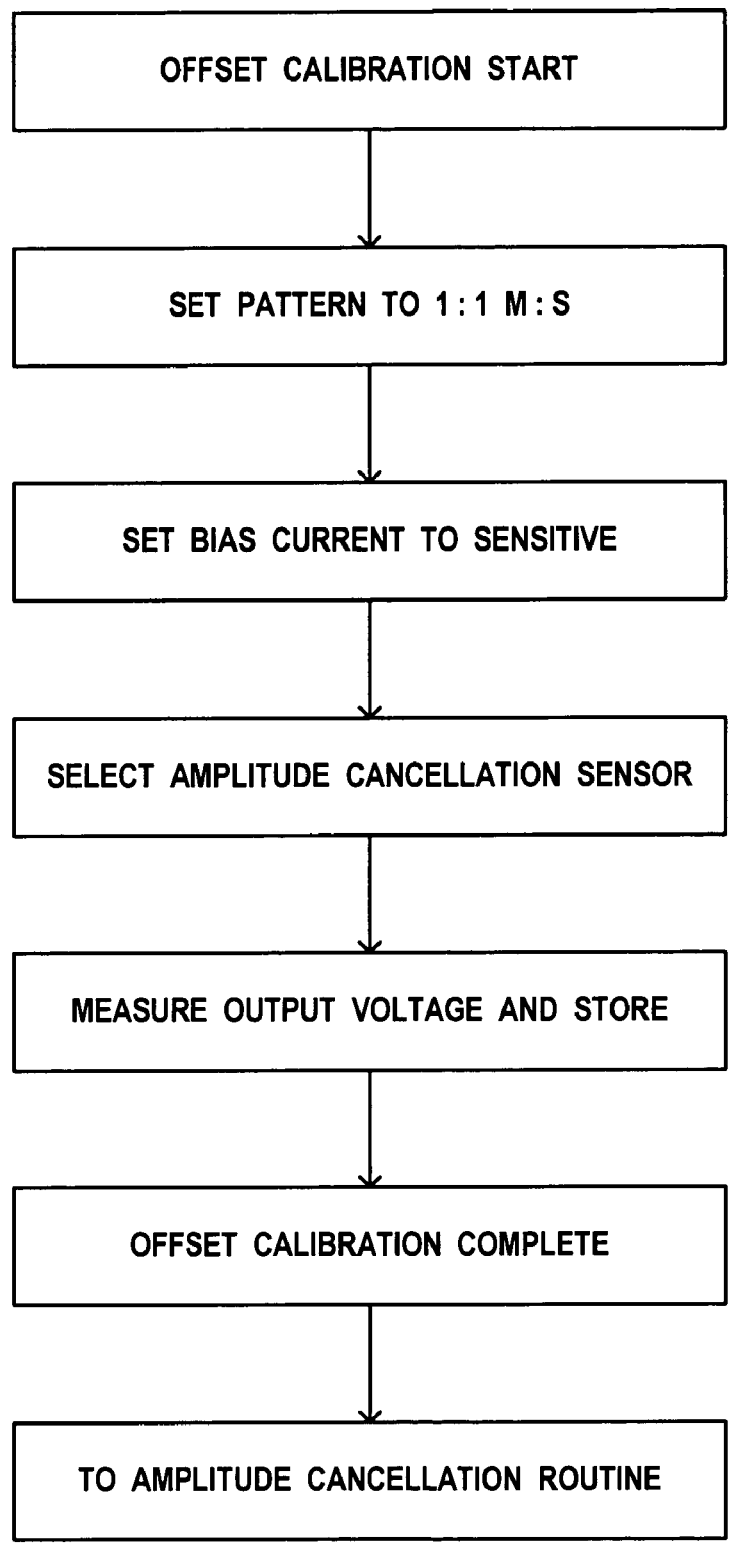
FIG. 13a, b, c, and d shows the flow diagram for the calibration of the channel using the amplitude and phase cancellation sensors.
Figure 13B:
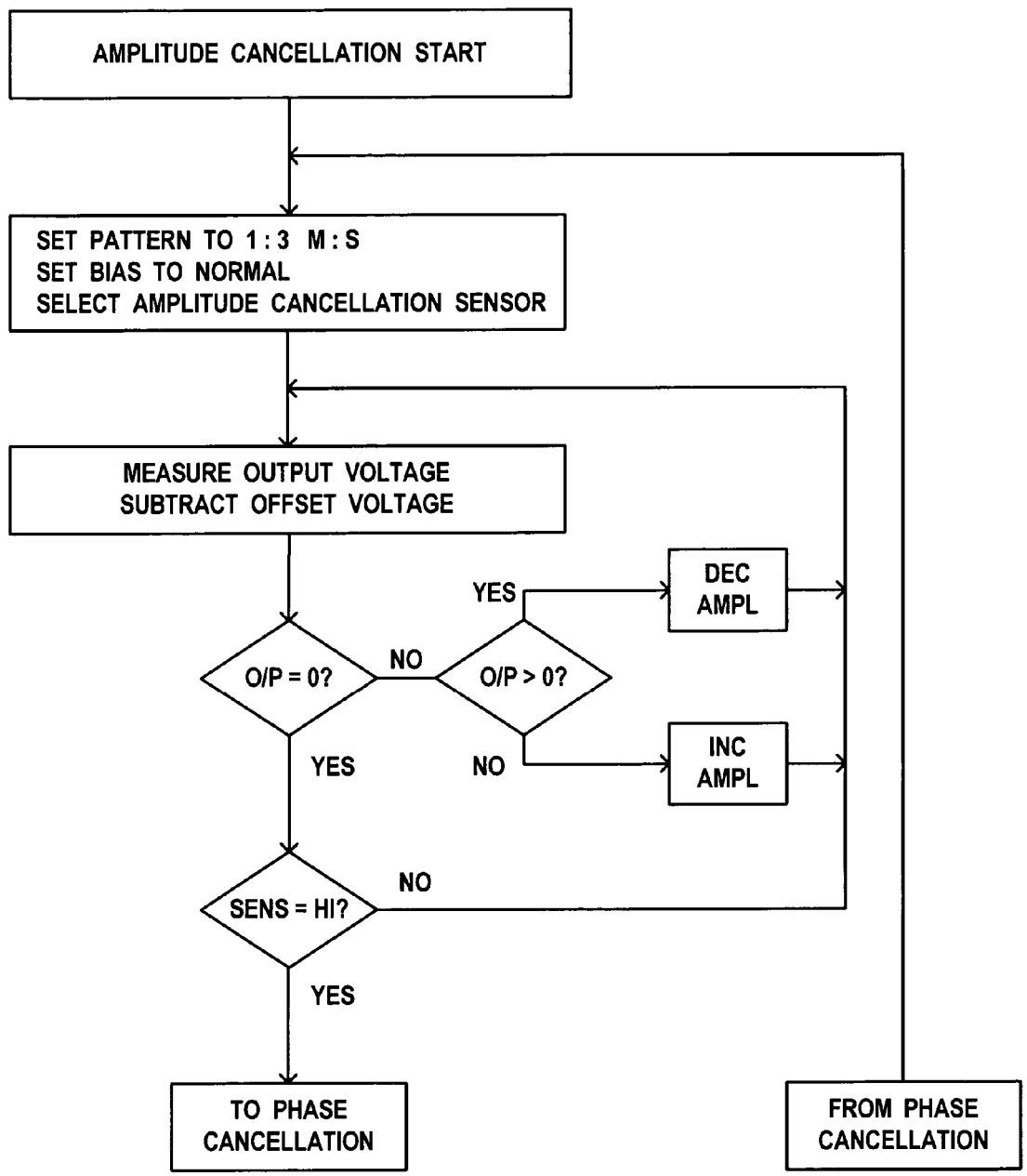
Figure 13C:
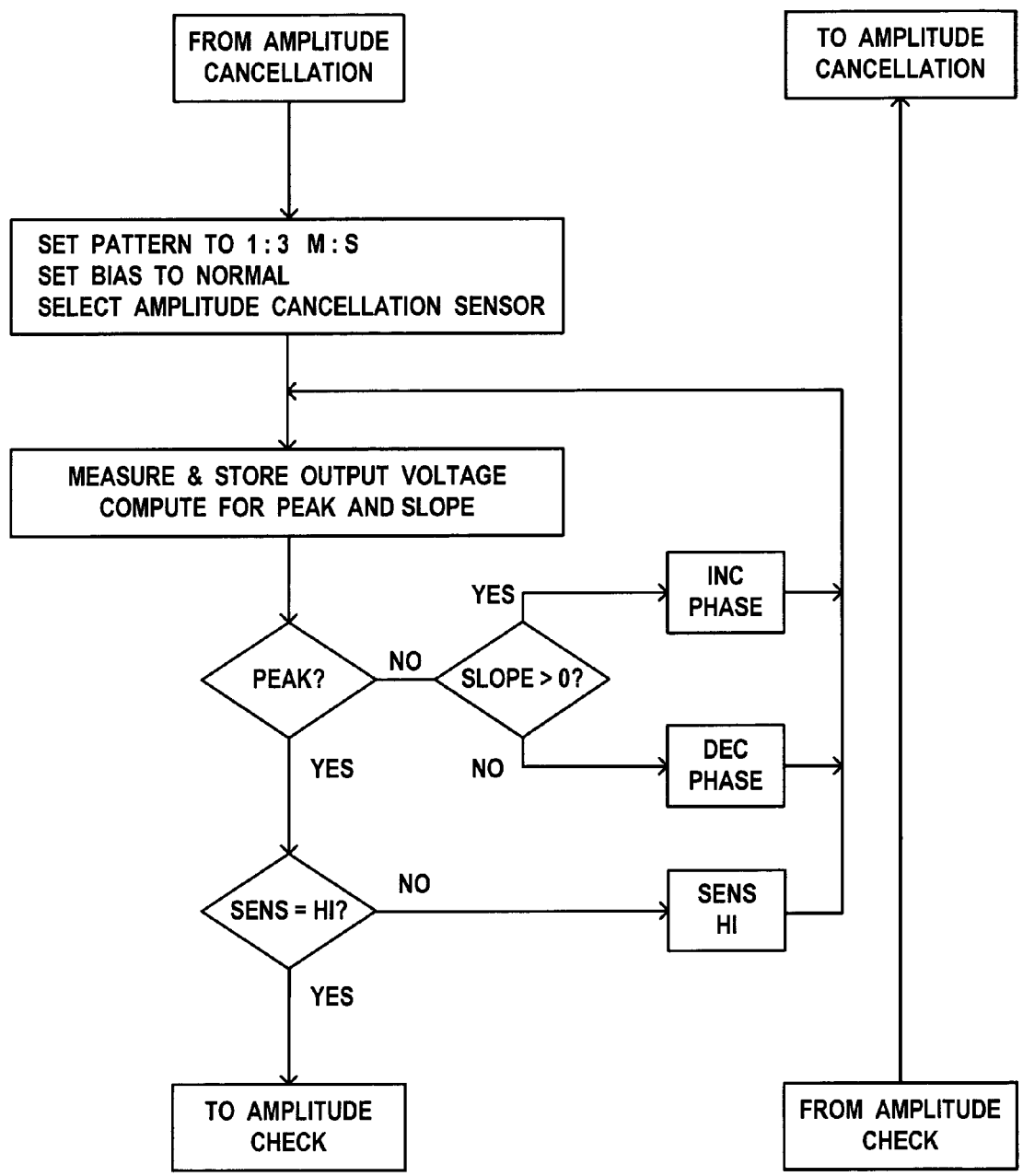
Figure 13D:
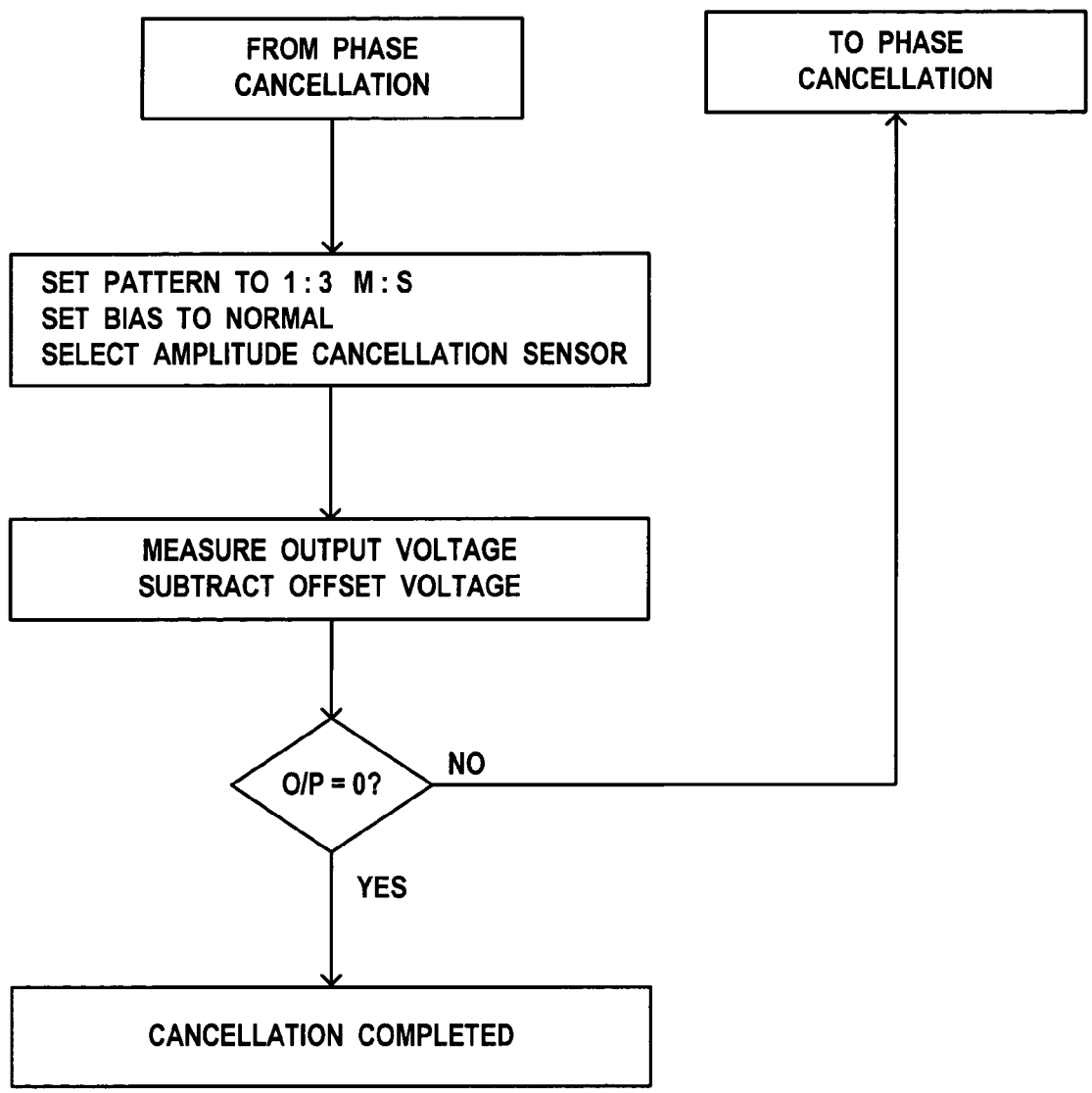

Mismatch errors between the sum of the currents 70 and the current 80 exhibit themselves as common mode offsets. Common mode offsets can be accommodated within the dynamic range of the circuit or, if the common mode offset is too large, by a common mode feedback circuit as depicted in FIG. 12. In FIG. 12 an amplifier 72 senses the common mode voltage across capacitor 73 and compares this against a reference voltage VCM. An error signal is then used to control current sources 70 to eliminate the common mode signal.

Mismatch errors in current sources 70 or, in transistors 80 and 81, exhibit themselves as a differential offset which would degrade the amplitude cancellation accuracy. In this embodiment an offset cancellation routine is performed as the first step in the overall amplitude cancellation algorithm. A second signal is injected into the channel which utilises a pattern with a 1:1 mark to space ratio. With a symmetric signal applied to the amplitude cancellation sensor circuit 50 it is possible to measure the offset at the output of the integrator through the ADC, 43. This voltage can then be subtracted from subsequent measurements from the amplitude cancellation sensor circuit when the pattern with a 1:3 mark to space ratio is injected into the channel. Offsets in the sample and hold and buffer are common to both sets of measurements and therefore also cancel. The calibration procedure is shown in the flow diagram in FIG. 14 as part of the algorithm for controlling the cancellation circuit operation.

It is also recognised that in another embodiment an offset measurement could be performed by shorting together the gates of transistors 80 and 81.

The amplitude cancellation sensor is relatively immune to phase differences between the transmitted signal and the cancellation signal. This is due to amplitude symmetry within the waveform of the high frequency content.

FIG. 9a shows the typical transfer function curve for integrator 50. The differential output voltage passes through zero when the amplitudes of the transmitted and cancellation signals are equal. The transfer function starts to saturate for large amplitudes of the cancellation circuit. However, the overall transfer function is still monotonic which allows its use in a control loop.

In this embodiment the sensitivity of the amplitude cancellation sensing circuit can be increased when close to the point of amplitude cancellation by increasing the bias currents 70 and 71 generated from the bias current generator 55.

FIG. 8b is now described:

The embodiment of the phase cancellation sensor formed by rectifier 51 and integrator 52 is a full-wave rectifying integrator followed by a sample and hold followed by a transconductor, amplifier or buffer.

The full-wave rectifying integrator is formed by two differential pairs of transistors, 180, 181 and 182, 183 configured with a deliberate voltage offset 165, 166 introduced into the sources of one transistor in each differential pair. The drains of transistors 181 and 182, which do not have the offset voltage in their source, are connected directly to one of the positive supply voltages. The drains of transistors 180 and 183, which do have the offset in the source, are connected together and to an integrating capacitor 173.

The phase cancellation sensor circuit formed by rectifier 51 and integrator 52 operates with three phases in a similar manner to the operation of the amplitude cancellation sensor 50.

In the reset phase switch 160 is used to reset the voltage across capacitor 173. One end of the capacitor 160 is connected to V33 while the other end is permanently connected to V18. Switches 161 are open removing the bias from transistors 180, 181, 182 and 183. Switches 163 are closed, shorting the gates of transistors 180, 181, 182 and 183 to ground. Switches 162 are open placing the sample and hold capacitor 174 in the hold mode.

In the integration phase, switch 160 is open allowing the integrating capacitor 174 to be charged when current flows in the drains of transistors 180 and 183. Switches 161 are closed allowing bias current to be applied to the transistors 180, 181, 182 and 183. Switches 162 are open maintaining the sample and hold capacitor 174 in the hold mode. Switches 163 are opened allowing the residual signal from the channel to operate on the gates of the differential pairs formed by transistors 180, 181 and 182, 183.

During the integration phase, the residual signal from the channel is applied across the gates of each differential pair formed by transistors 180, 181 and 182, 183. When the differential input signal VINP-VINN is larger than the offset, 165, current flows in transistor 180 which charges the capacitor 173, increasing the voltage across the capacitor. Similarly, when the differential input signal VINN-VINP is larger than the offset 166 current flows in the drain of transistor 183 and results in the voltage across capacitor 173 increasing. In this way the signal is clipped, full-wave rectified and integrated.

Current is generated by both differential pairs from positive or negative portions of the residual signal. The voltage across the capacitor is single-ended in this embodiment and a differential signal is generated in the differential buffer after the sample and hold capacitor by the use of a fixed voltage for the other half of the differential signal.

The integrating capacitor 173 is reset to V33 as current is always unipolar from the full-wave rectifier, resulting in the voltage on the capacitor always going more negative than V33. This increases the dynamic range of the circuit.

The capacitor 173 only has a common mode component as it operates single-ended. However, the sample and hold capacitor, 174 retains both common mode and differential components as shown in FIG. 12.

In the transfer phase switches 160 and 161 are open with switches 162 and 163 closed. The charge on the integrating capacitor 173 is shared between the integrating capacitor 173 and sample and hold capacitor 174. After a number of cycles the voltage on the sample and hold capacitor 174 increases asymptotically to the value of the voltage across the integrating capacitor just prior to the transfer period.

After the transfer phase the reset phase occurs and the cycle repeats continuously. It should be noted that the insertion of a buffer between the integrating capacitor 173 and the switches 162 for the sample and hold could result in an output which could be obtained without the multiple cycles of the present embodiment.

The phase cancellation sensor circuit formed by 51 and 52 has a degree of immunity to variations in signal amplitude. FIG. 9b shows the transfer function of the phase cancellation sensor circuit for different amplitudes of the residual signal in the channel. There is still a peak in the transfer function at the phase cancellation point although the sensitivity is degraded.

It is possible in this embodiment to increase the circuit sensitivity close to the optimum cancellation point by increasing the bias currents 171 by control of the main bias current generator 55.

The phase cancellation sensor has a certain degree of immunity in the presence of non-complete amplitude cancellation. FIG. 9c shows the transfer function of the phase cancellation sensor circuit for small differences in the amplitudes of the transmitted and cancellation signals. There is still a peak in the transfer function at the phase cancellation point but the magnitude of the peak has diminished. This can be accommodated within the dynamic range of the circuit.

Calibration of offsets could be performed by placing a short-circuit across the gates of 180, 181, 182 and 183. However, the circuit is not very sensitive to small offsets due in part to the large headroom achieved by resetting the integrating end of 173 to V33.

The offsets in the sources of the differential pairs, 165 and 166 may be introduced by deliberately mismatching the input transistors. However, in this embodiment an offset is generated with the introduction of a resistor in the source of one half of each differential pair and a current source feeding into the node at the junction of the source and resistor. The current source in this embodiment, 161, is made to vary with the sheet resistance of the resistors used in the sources, 167, in order that the offset remain fixed over process and temperature. In another embodiment it is possible to introduce an offset which varies as a function of process parameters.

The outputs of the amplitude cancellation and phase cancellation sensor buffers, 90 and 190, as shown in FIG. 8a and FIG. 8b, respectively, are multiplexed. A control signal from the FSM, 42, is connected to the enable of buffer 90 and to an inverter 210. The output of inverter 210 is connected to the enable of buffer 190. As buffers 90 and 190 are transconductance stages the output current can be enabled or disabled by the logic state of the control signal from the FSM. A logic high on the control signal integrator$_{13}$select will enable the output current from buffer 90 while a logic low will enable the output current from buffer 190. Transistors 200 and 201 form a cascade stage which maintains a low impedance on the multiplexed outputs enabling the whole circuit to be placed close to the edge of the integrated circuit.

FIGS. 13a, 13b, 13c and 13d shows a typical flow diagram for the cancellation algorithm. There are four main steps in the cancellation procedure. First, calibration of offsets in the amplitude cancellation sensor is performed. Offset calibration is followed by amplitude cancellation. Phase cancellation follows amplitude cancellation and finally an amplitude cancellation check is performed to ensure that the phase cancellation has not disturbed the amplitude cancellation. Dependent on whether the cancellation signal buffers 14 and 15 allow independent control of amplitude and phase it may be necessary to iterate around the amplitude and phase cancellation loops and this possibility is shown in the flow diagram. A further improved embodiment of the amplitude and phase cancellation circuit will be discussed now with reference to FIG. 14.

According to this embodiment, in addition to amplitude and phase control of the feed-forward signal (third signal) to be matched to the propagated signal (first signal) in order to cancel out the propagated signal in the receiver part of the bidirectional port, for maximum cancellation, and therefore maximum performance, the rise and fall times of the feed-forward and propagated signals are also adjusted.

Figure 14:
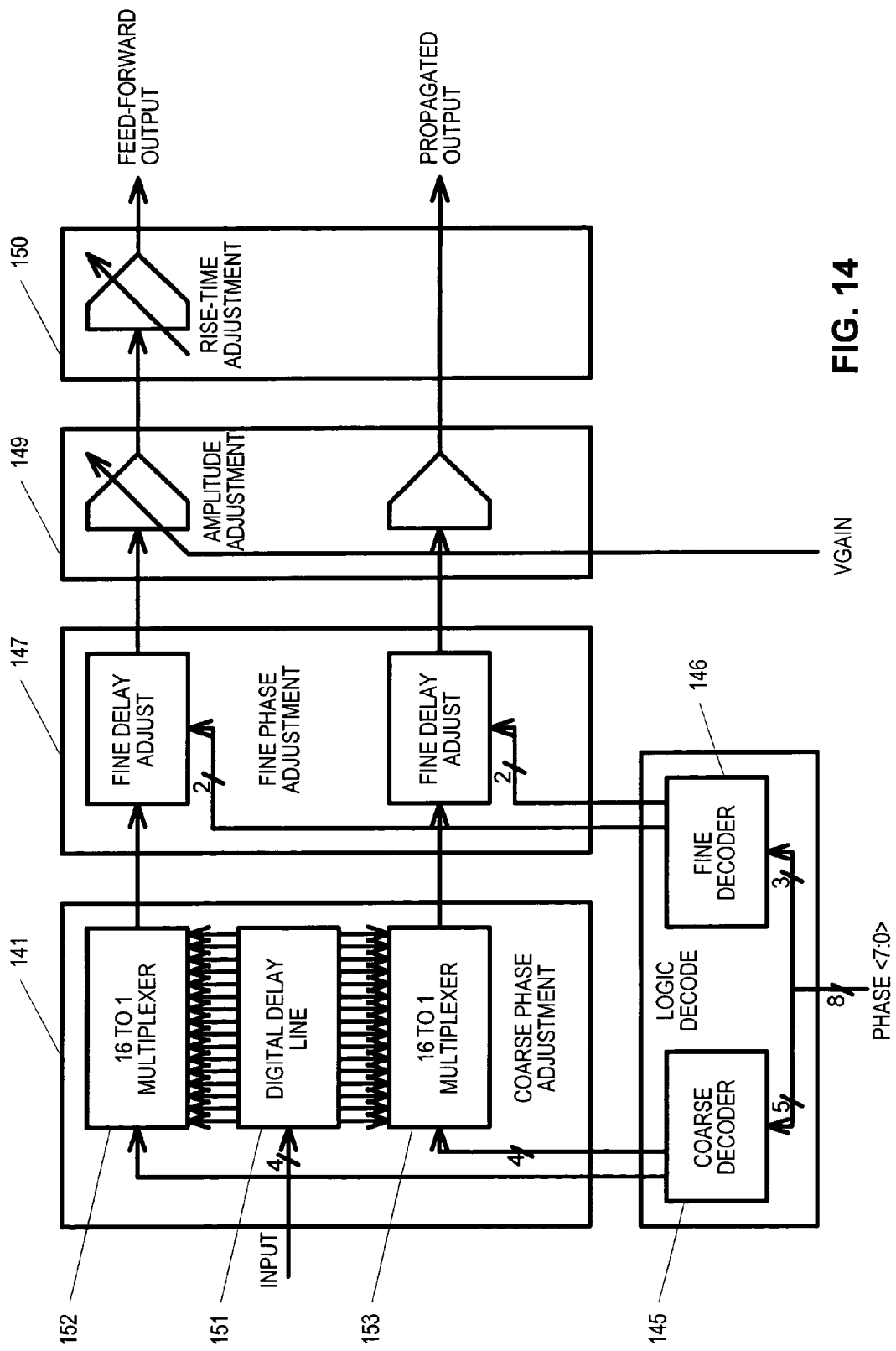
FIG. 14 shows a feed-forward amplifier block diagram according to the preferred embodiment of the invention.

This implementation of the feed-forward amplifier allowing amplitude, phase and rise-time control is shown in FIG. 14. Further, the ramification of matching a third parameter (rise time) is discussed in relation to flow-charts in FIGS. 13a-13d.

Feed-forward Amplifier

The block diagram in FIG. 14 shows the structure of the feed-forward amplifier that implements the phase, amplitude and rise-time control. The feed-forward amplifier according to this embodiment consists of:

a coarse phase adjustment block 141;

a fine phase adjustment block 147;

an amplitude control block 149;

a rise-time control block 150.

Phase alignment of the feed-forward and propagated signals is performed in two stages. First a coarse phase alignment is made which is followed by a fine phase alignment. In the final stages, amplitude control and rise-time control of the feed-forward signal are performed.

Coarse Phase Adjustment Block

Several alternative architectures for the coarse delay adjustment circuit can be easily designed by a circuit engineer skilled in the art.

Figure 15:
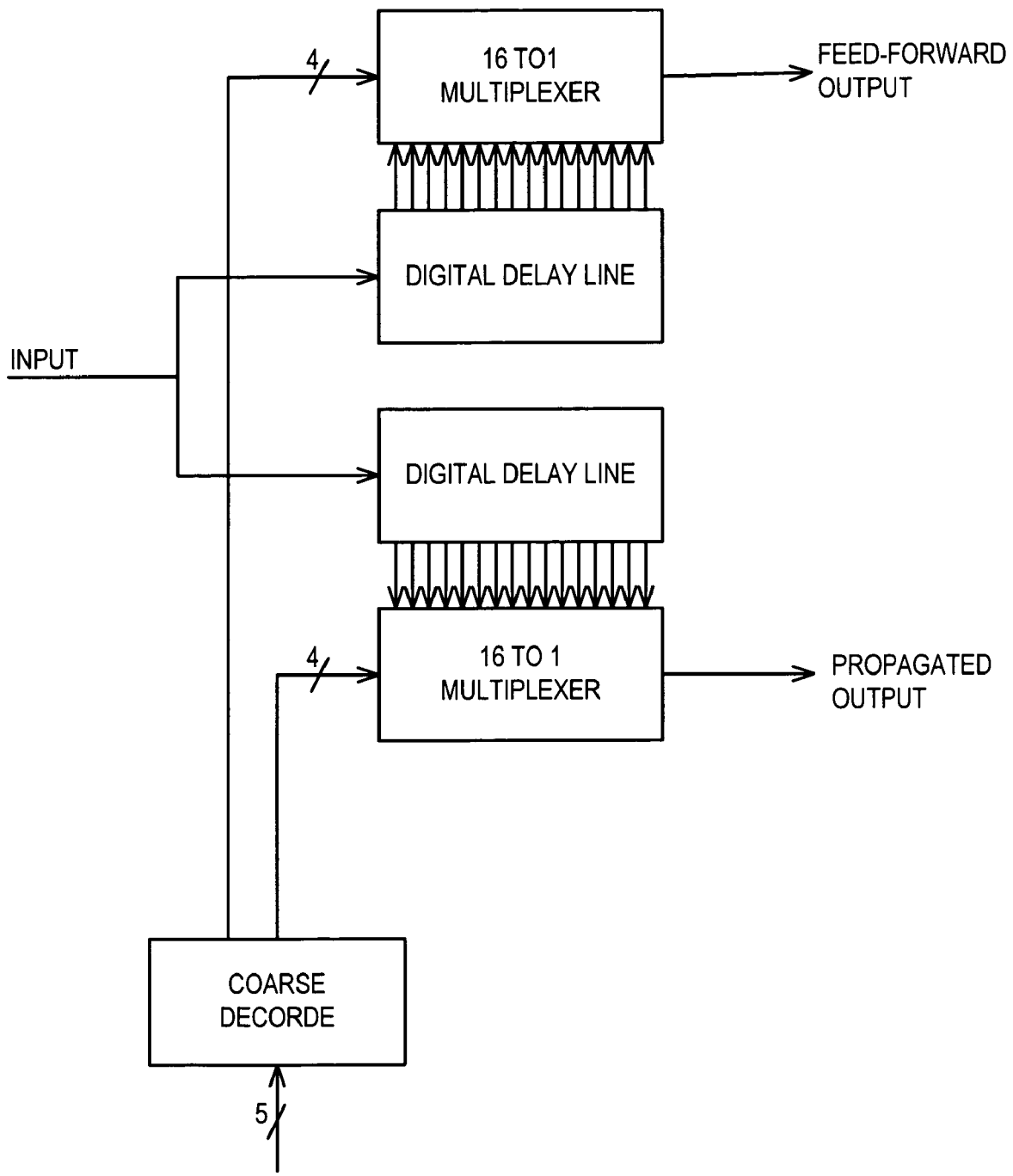
FIG. 15 shows one of the possible implementations of a coarse delay circuit.

A simplest one shown in FIG. 15 would entail the input signal feeding two delay lines and multiplexers, one delay line and multiplexer for the propagated signal and one delay line and multiplexer for the feed-forward signal. However, this scheme would have extensive circuitry and therefore consume much power and area on the ASIC.

Figure 16:
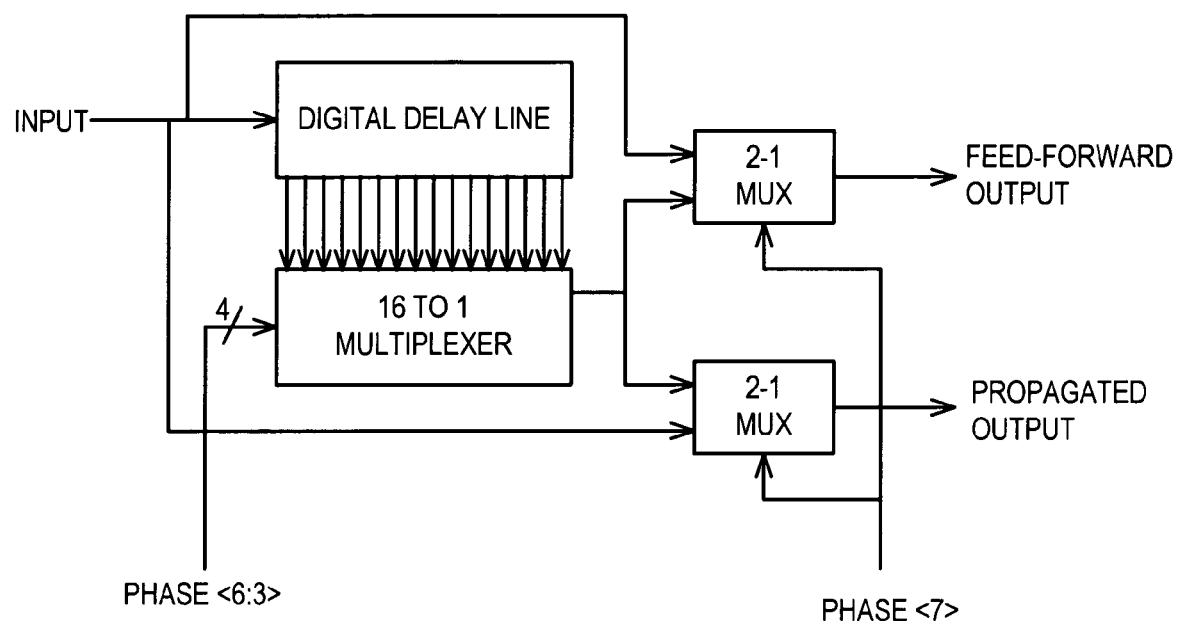
FIG. 16 shows another possible implementation of a coarse delay circuit.

Another possible implementation shown in FIG. 16 uses only one delay line and multiplexer and route the signal that required to be delayed through the delay line while the other signal was routed around the delay line. The drawback to this second scheme shown in FIG. 16 is the delay through the multiplexer is added to the delay through the digital delay line. This means that the minimum delay between the two output signals is the delay through the multiplexer, which can be significantly larger than the delay of an individual stage of the digital delay line. Adding delay stages in the signal path not passing through the delay line negates the benefits of power and area that the second scheme may have initially indicated were possible.

Figure 17:
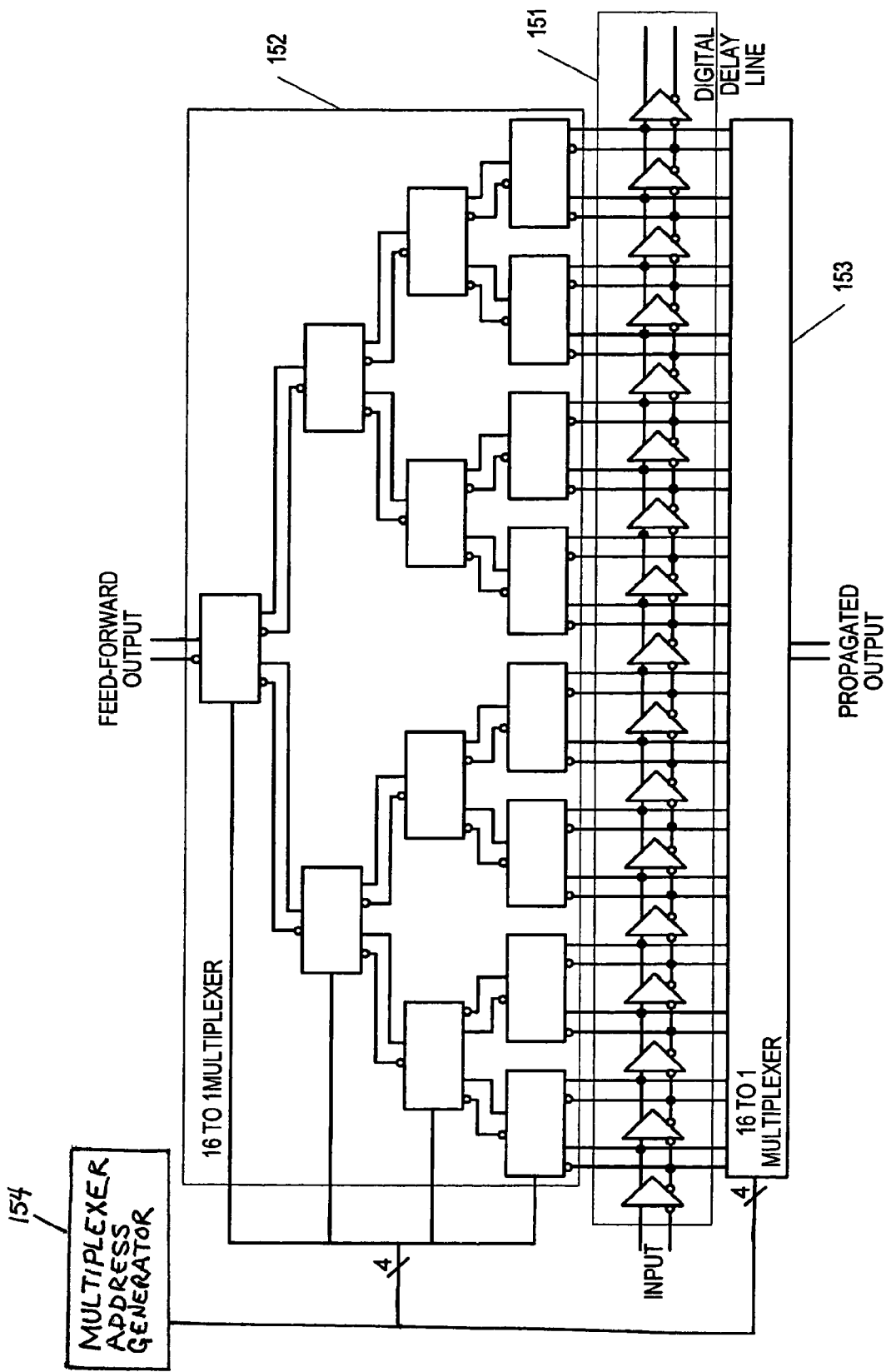
FIG. 17 shows a preferred implementation of a coarse delay circuit.

A preferred embodiment of the coarse delay circuit is shown in FIG. 17.

The preferred solution is a circuit that comprises a digital delay line 151, two multiplexers 152, 153 and a multiplexer address generator 154. The input signal drives the digital delay line 151 and delayed versions of the input signal appear at each tap of the digital delay line. One multiplexer 152 selects a delayed version of the input signal for the feed-forward signal path and the other multiplexer 153 selects another, or possibly the same, delayed version of the input signal for the propagated signal path. The benefit of the proposed architecture is the minimisation of power and area through the sharing of the delay line and the delay between the two output signals due only to the delay in the digital delay line.

Decoding of the logic signals into the form required by the multiplexers is provided in the circuit multiplexer address generator — COARSE DECODE 145 in FIG. 14.

The digital delay line 151 is formed by a cascade of buffer/amplifiers. The delay between individual buffer stages is 20 pS which is too large to achieve the degree of phase matching for the level of cancellation required (less than 3 pS) at a data rate of 10 Gbps. This necessitates the addition of a fine phase adjustment circuit in the design.

Adjacent outputs of the digital delay line 151 are connected to the inputs of 2-1 multiplexers. A tree of multiplexers 152 selects the signal from the desired tap on the digital delay line 151. One of the 16-to-1 multiplexers, say 142 in FIG. 14 selects the feed-forward signal while the other 16-to-1 multiplexer, say 144 in FIG. 14, selects the propagated signal. Each of the 16-to-1 multiplexers 142, 144 operates with a unique set of control signals, a 4-bit word. In this implementation, a 5-bit word input to the COARSE DECODE 145 is transformed into two 4-bit words, one for each multiplexer 142, 144.

The manner in which the taps on the digital delay line 151 in FIG. 17 are accessed allows 31 possible increments of delay to be formed from the 16-bit digital delay line. The addressing of the taps in the delay line can be thought of as pointers. One pointer is used to select the tap for the feed-forward signal. A second pointer is used to select the tap for the propagated signal.

Since it is necessary to implement both positive and negative delay between the propagated signal and the feed-forward signal the pointers can be positioned relative to each another to achieve this function.

To delay the feed-forward signal relative to the propagated signal it is necessary to position the propagated signal pointer before the feed-forward signal. The reverse is true to delay the propagated signal relative to the feed-forward signal.

If the situation arose where it was necessary to introduce only one stage of delay it is conceivable that the two pointers could be positioned anywhere along the delay line where they would be separated by one tap. However, as the input signal passes through the digital delay line some signal dispersion occurs whereby inter-symbol interference is introduced. So, in this example, the best performance is obtained by positioning the pointers as close to the start of the digital delay line as possible, not any arbitrary position. With this in mind the positioning of the pointers works as follows:

one pointer is always positioned at the first tap of the digital delay line and the other pointer moved to produce the required delay.

should a delay need to be introduced into the feed-forward path then the propagated pointer is positioned at the first tap and the feed-forward pointer is moved to the tap which gives the required delay.

similarly, should a delay need to be introduced into the propagated path then the feed-forward pointer is positioned at the first tap and the propagated pointer moved to the tap which gives the required delay.

Figure 18:
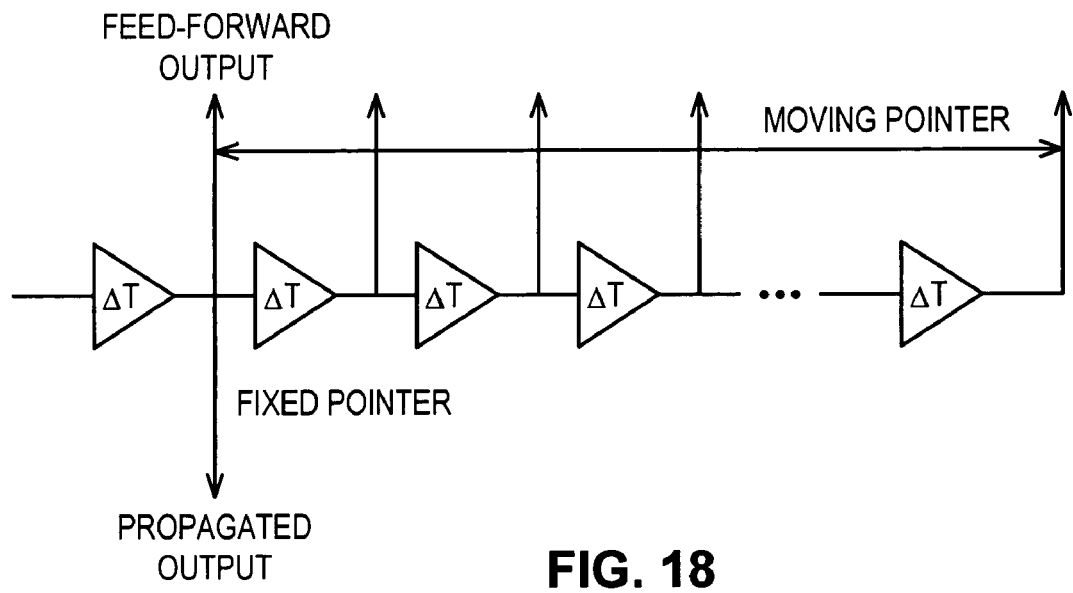
FIG. 18 shows a coarse delay means for the feed-forward (or, third) signal.
Figure 19:
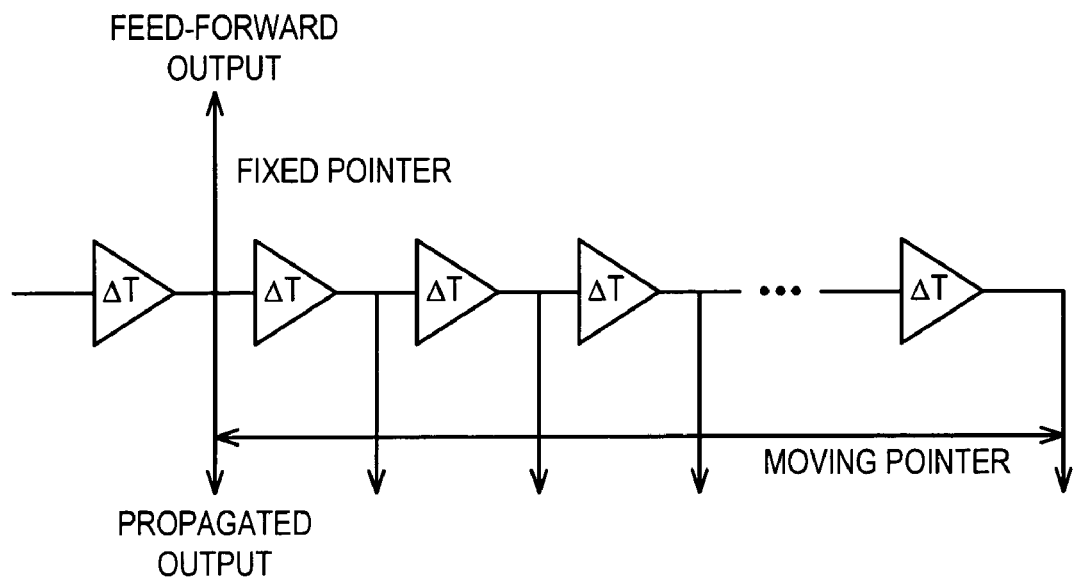
FIG. 19 shows a coarse delay means for the propagated (or, first) signal.

The FIGS. 18 and 19 illustrate how the pointers are positioned for these scenarios.

Figure 20:
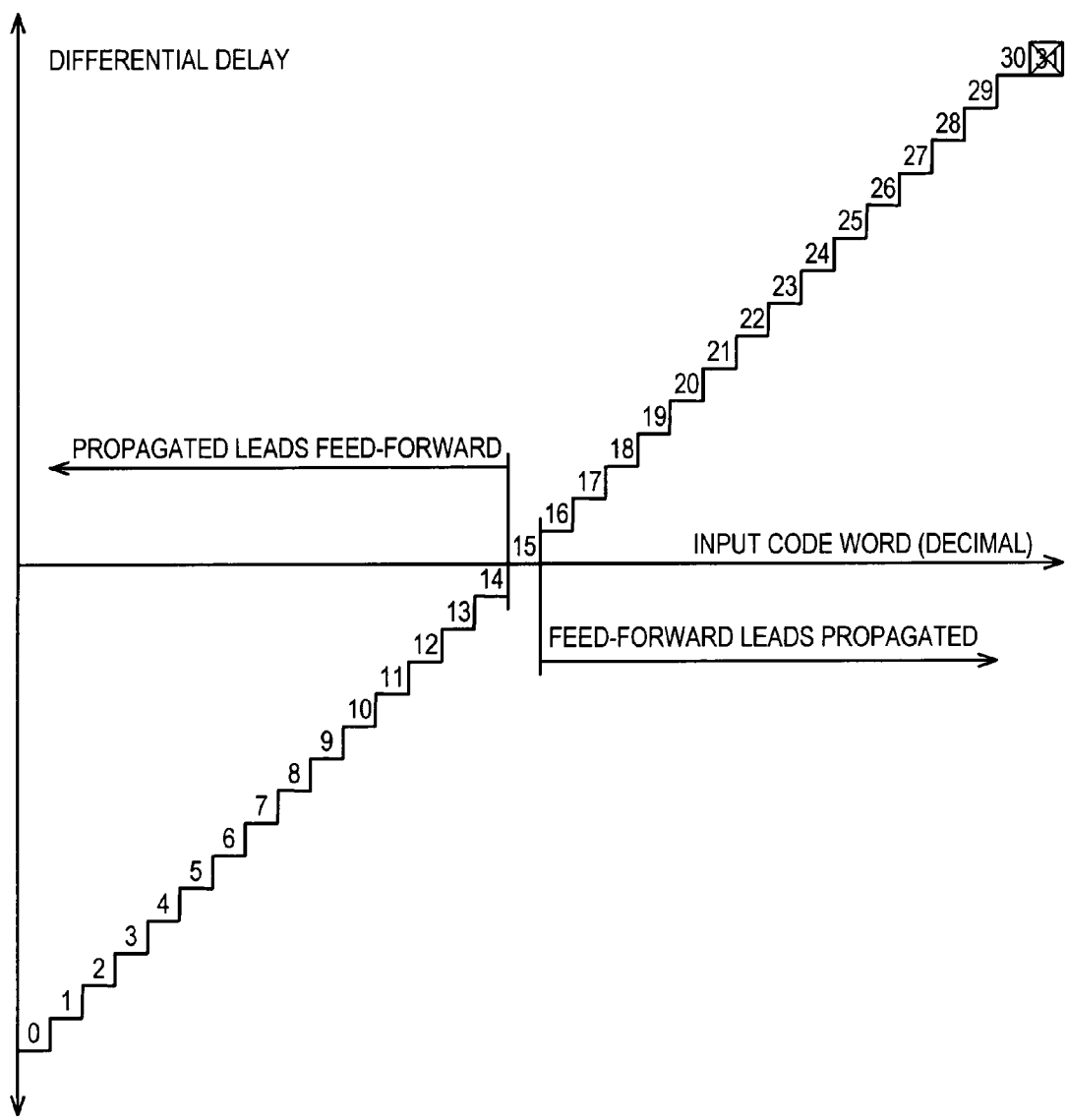
FIG. 20 shows a coarse delay versus input code word.

The delay transfer function i.e. the differential delay between the feed-forward and propagated signals for different control words is shown in FIG. 20. Note that the input code word of all-1's is an illegal code in this embodiment.

The 5-bit input word to the COARSE DECODE 145 was required to generate steps in delay between the feed-forward and propagated signals in a linear manner. The logic to generate the 16-to-1 multiplexer addresses from the 5-bit input word is given in the truth-table below:

TABLE 1

| Logic Decode for the Coarse Phase Adjustment | | |
| --- | --- | --- |
| PHASE<7:3> | Propagate<3:0> | Feed-forward<3:0> |
| 00000 | 0000 | 1111 |
| 00001 | 0000 | 1110 |
| 00010 | 0000 | 1101 |
| : | : | :| |
| 01111 | 0000 | 0000 |
| 10000 | 0001 | 0000 |
| 10001 | 0010 | 0000 |
| 10010 | 0011 | 0000 |
| : | : | : |
| 11110 | 1111 | 0000 |
| 11111 | XXXX | XXXX |

It can be clearly seen that the logic function can be implemented in the following manner:

when the most-significant bit of the 5-bit input word is low, the propagate pointer is set to the first tap (address 0) and the feed-forward pointer is formed from the complement of the lower four bits of the 5-bit input word; this delays the feed-forward signal relative to the propagated signal;

when the input 5-bit word is (01111) the feed-forward and propagated pointers both address the first tap of the digital delay line, giving zero delay;

when the most-significant bit of the 5-bit input word is high, the feed-forward pointer is set to the first tap (address 0) and the propagated pointer is formed from the lower four bits of the 5-bit input word. The propagated pointer word is the word formed from the lower 4 bits of the 5-bit input word plus one. This delays the propagated signal relative to the feed-forward signal;

The logic to implement this function is straight-forward and evident for a specialist in the art and is not discussed here.

It is appreciated that the length of the delay line only needs to be able to cover the variation in the delay between the two signals. A sixteen-bit delay line was chosen in the initial design to be able to exercise the algorithm over a large phase range and to cover any possible inaccuracies in the simulation results.

Fine Phase Adjustment Block

Figure 21:
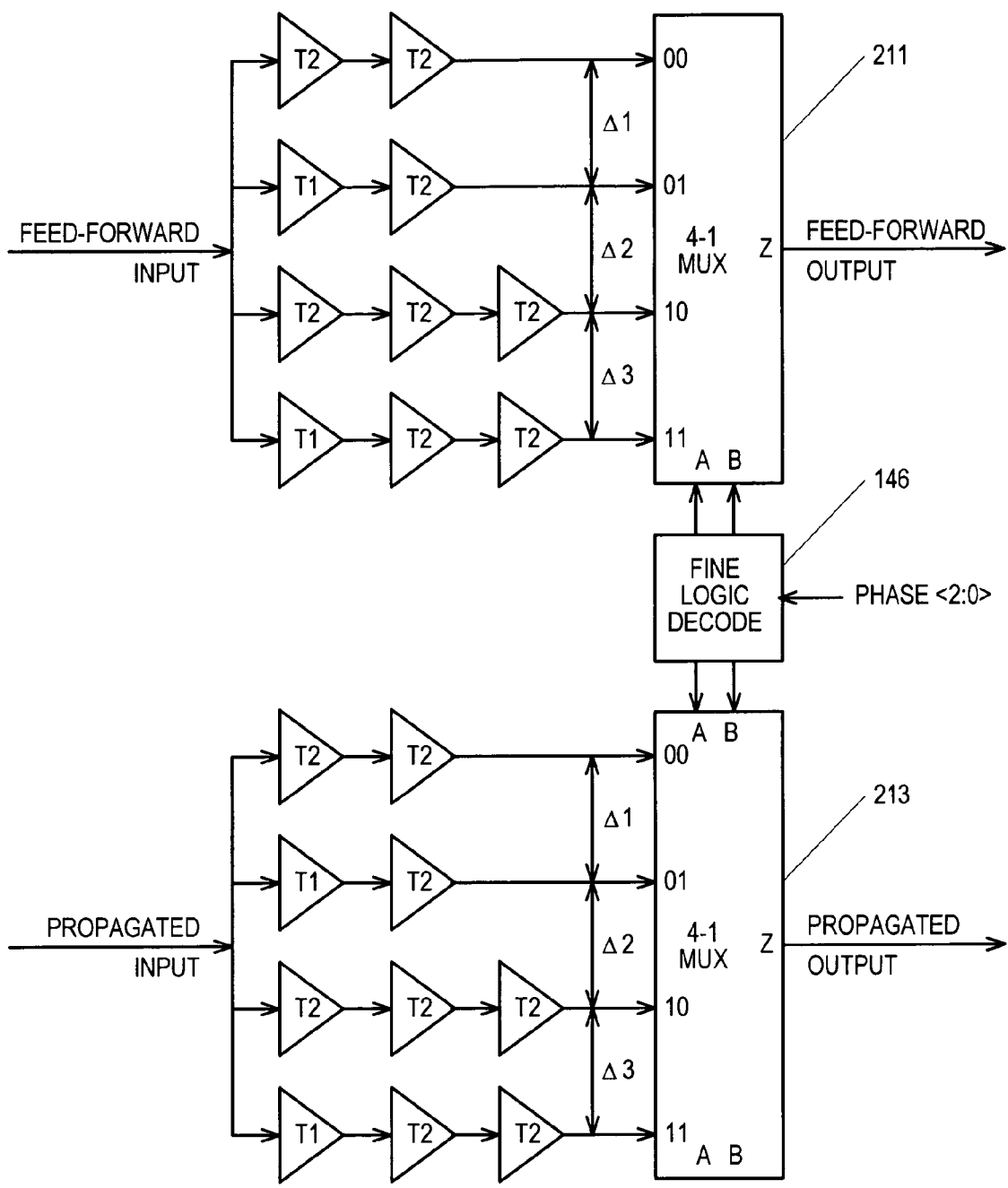
FIG. 21 shows an example fine delay adjustment block diagram.

An embodiment of fine phase adjustment block is shown in FIG. 21. In this bi-directional interface it is necessary to match the phase of the feed-forward and propagated signals to within a few picoseconds. As has been discussed in the preceding section, the coarse phase adjustment block shown in FIG. 17 has a resolution of one tap of the digital delay line i.e. 20 pS approximately. A circuit not unlike the coarse phase adjustment is used for fine phase adjustment except the delays are smaller.

In the digital delay line all the buffer/amplifiers are identical and have identical loads so produce identical delays. Obviously there will be some variance in the delay per stage of the digital delay line due to mismatches but this is generally much smaller than the delay per stage.

FIG. 21 shows the fine delay adjustment scheme implemented in this design. The design uses the fact that very small differential delays can be produced by examining the outputs between two differently sized buffers. Absolute delay in this scheme is not a major consideration as it is the phase difference between the feed-forward and propagated signals that is to be matched.

Figure 22:
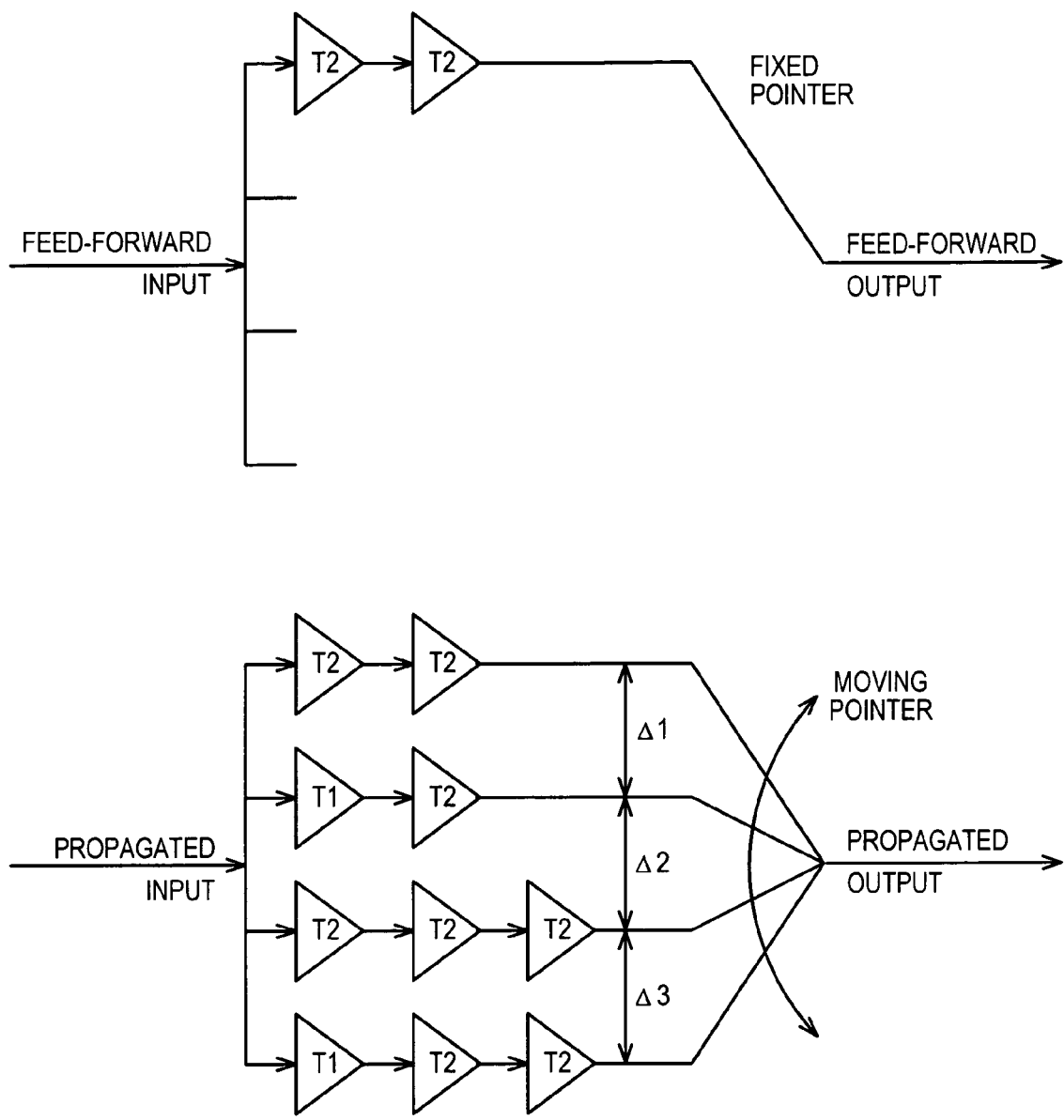
FIG. 22 shows a delay means for a propagated (first) signal
Figure 23:
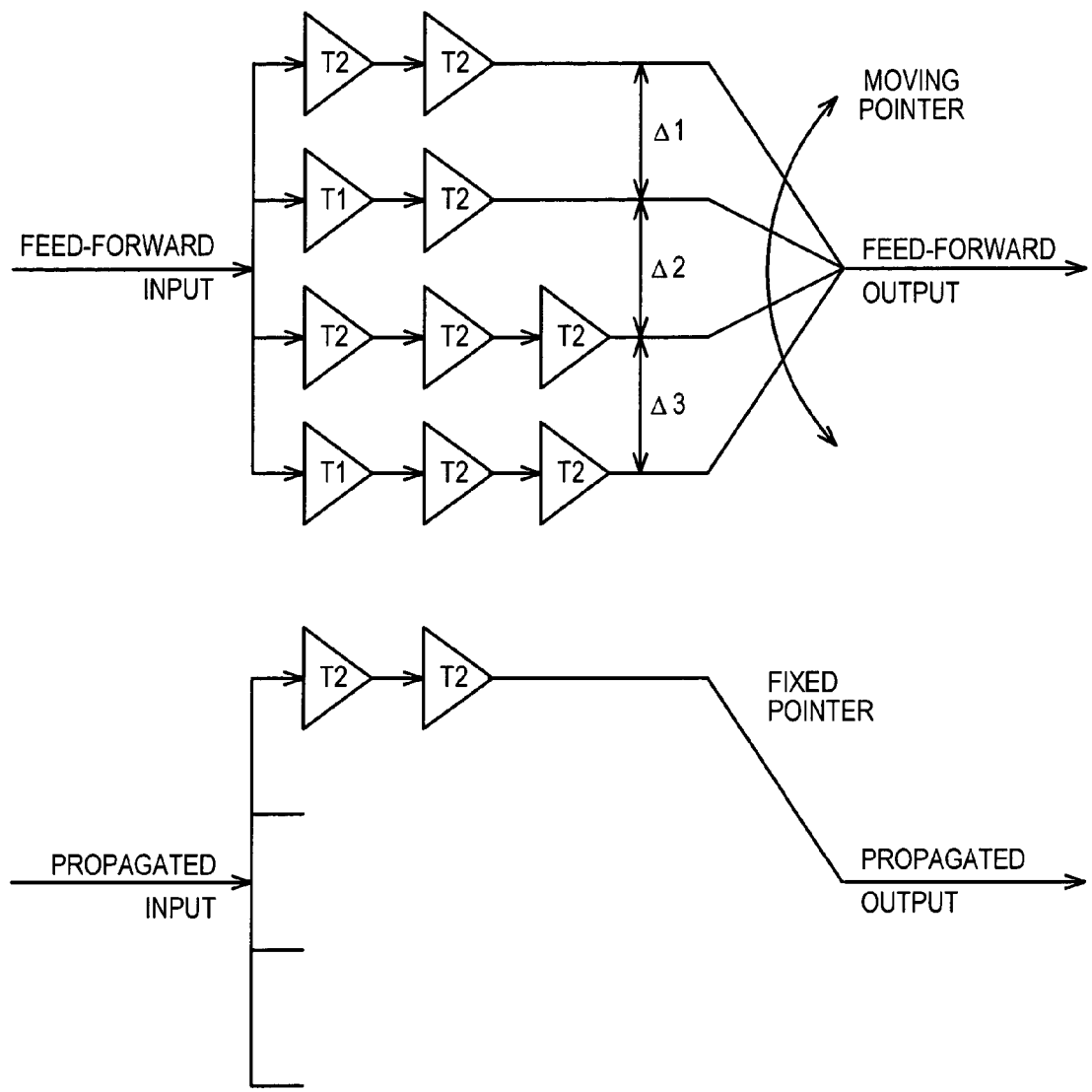
FIG. 23 shows a fine delay means for a feed forward (third) signal.

An array of differently sized buffers is placed in the feed-forward and propagated signal paths. There are four outputs from the array of buffers. A 4-to-1 multiplexer 211, 213 follows each array and selects a delayed version of the propagated or feed-forward signal. The control of the multiplexers 211, 213 is similar to the control of the 16-to-1 multiplexers 142, 144 in the coarse phase adjustment circuit. That is, when it is necessary to introduce delay in the feed-forward path multiplexer 213 for the propagated path selects the shortest delay path for the propagated signal while multiplexer 211 for the feed-forward path selects the delayed feed-forward signal. Similarly when it is necessary to delay the propagated signal multiplexer 211 for the feed-forward path selects the shortest delay path for the feed-forward signal while multiplexer 213 for the propagated path selects the delayed propagated signal. This is shown in FIG. 22 and FIG. 23.

A 3-bit control word is used to generate two independent 2-bit control words, one for the feed-forward multiplexer and one for the propagated multiplexer. The decoding of the 3-bit word into two 2-bit words is shown in table 2 below.

TABLE 2

Fine Phase Control Decode

| PHASE<2:0> | Feed_fine<1:0> | Prop_fine<1:0> |
|---|---|---|
| 000 | 11 | 00 |
| 001 | 10 | 00 |
| 010 | 01 | 00 |
| 011 | 00 | 00 |
| 100 | 00 | 01 |
| 101 | 00 | 10 |

TABLE 2-continued

Fine Phase Control Decode

| PHASE<2:0> | Feed_fine<1:0> | Prop_fine<1:0> |
|---|---|---|
| 110 | 00 | 11 |
| 111 | XX | XX |

Notes:
Feed_fine <1:0> connects to the multiplexer in the feed-forward path while Prop_fine <1:0> connects to the multiplexer in the propagated path.
There are seven delays steps possible and one illegal code. These seven steps need to cover the maximum step size in the coarse delay adjustment circuit.
A range of 7 x 5 pS is possible with the fine phase adjustment circuit.
With a fine delay resolution of 5 pS it is possible to match the feed-forward and propagated signals to within 2.5 pS of each other.
When the most-significant bit, PHASE<2>, is low then delay is introduced into the propagated signal path.
When the most-significant bit, PHASE<2>, is high then delay is introduced into the feed-forward path.

Figure 24:
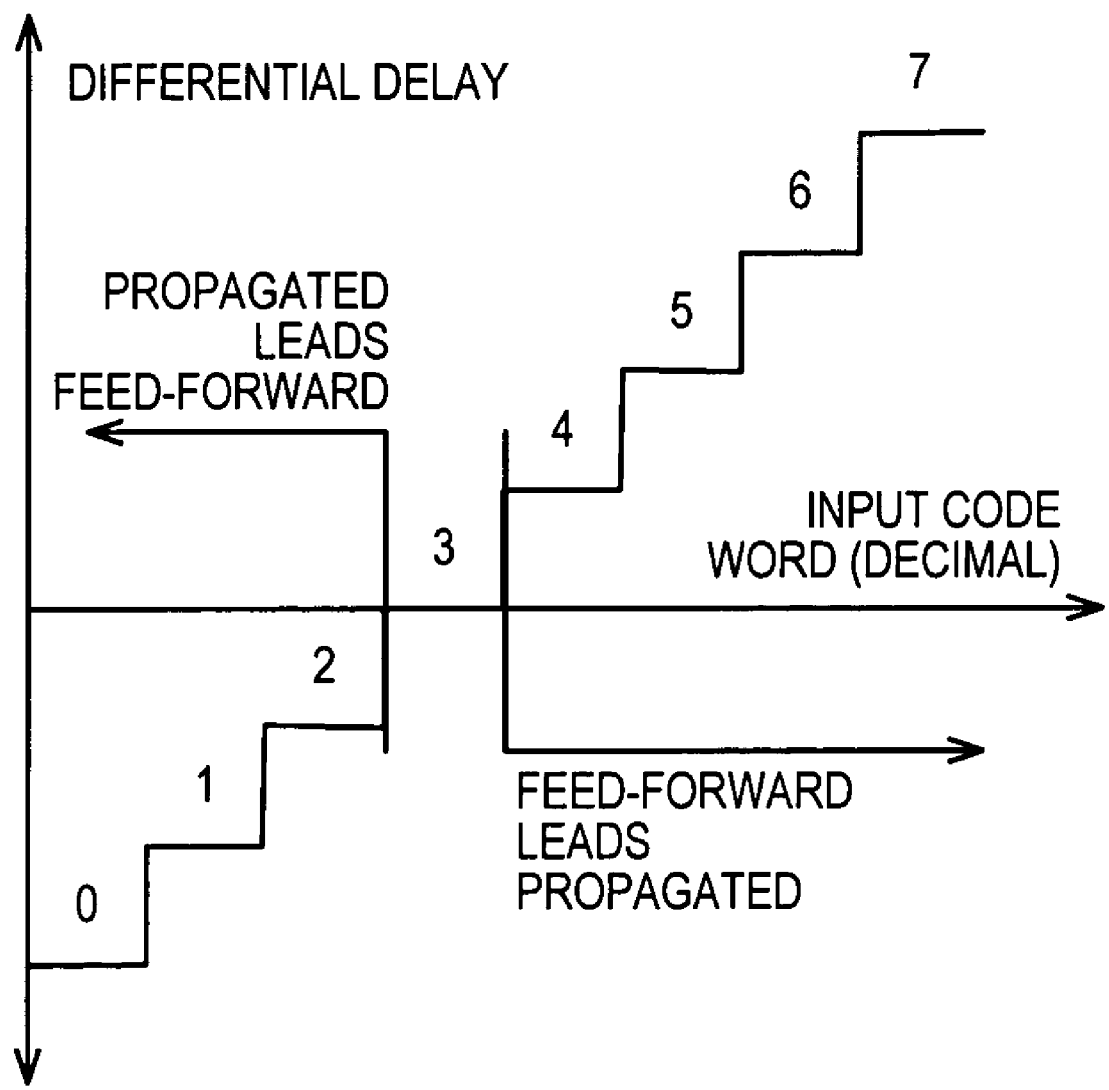
FIG. 24 shows a fine delay transfer function.

In FIG. 24 the delay transfer function is shown for the fine delay adjustment circuit of FIG. 21.

Rise Time Control

It has been found that matching of amplitude and phase alone may not result in sufficient cancellation of the propagated signal in some systems. Consider the case where there is considerable difference between the rise-times of the feed-forward and propagated signals. At very high data rates the rise-time of the propagated signal may be a significant portion of the bit cell e.g. 80 pS for a 100 pS bit period. It is relatively easy to generate signals on-chip with faster rise-times and this is likely to be the case for the feed-forward signal.

Figure 25:
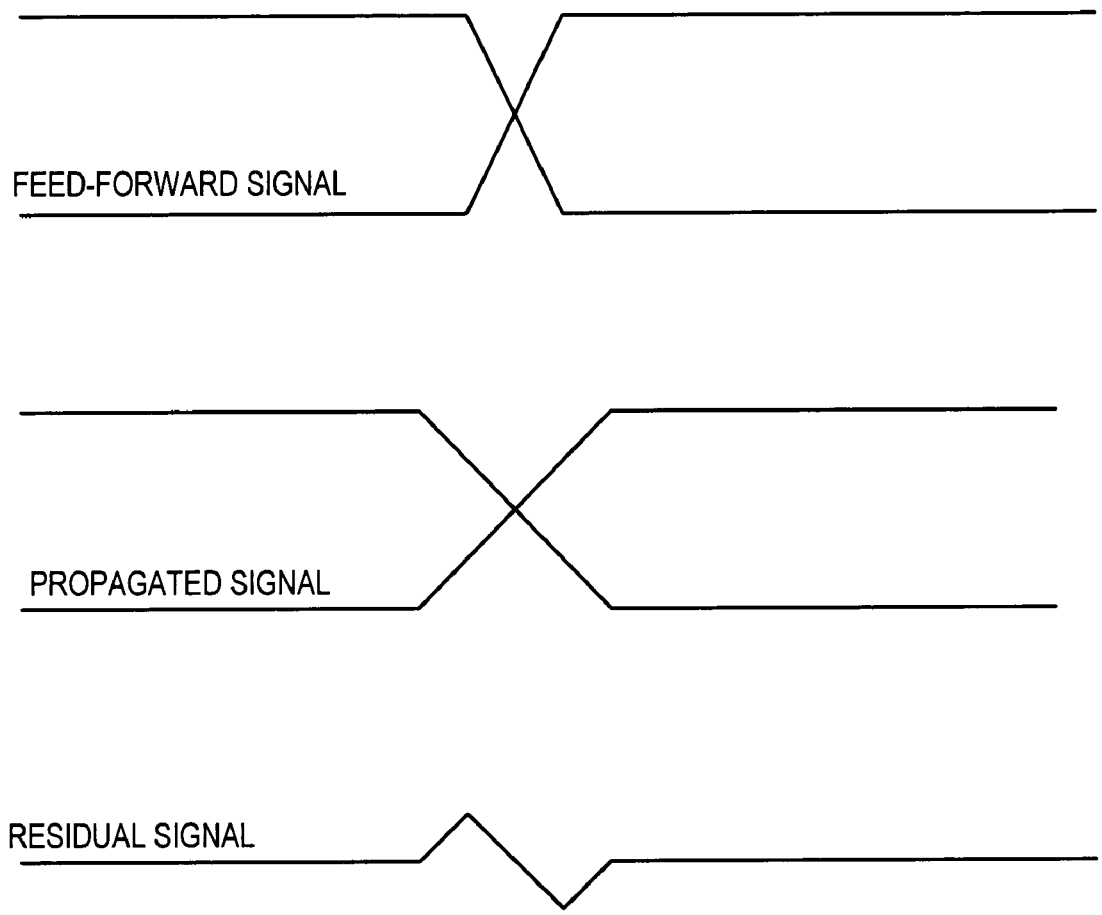
FIG. 25 illustrates the need for rise-time control of the feed forward and propagated signal.

FIG. 25 illustrates the situation where the feed-forward signal is much faster than the propagated signal. The residual signal amplitude can be significant even though amplitude and phase matching has been achieved between the propagated and feed-forward signals. Clearly rise-time control is required.

It is understood that the rise-time of the propagated signal is mainly due to capacitance on the output signals of the bidirectional port. It is proposed to add capacitance to the feed-forward signal to increase the rise-time. This assumes that the feed-forward signal has a lower rise-time than the propagated signal and the circuit is designed accordingly to ensure that this is the case.

Figure 26:
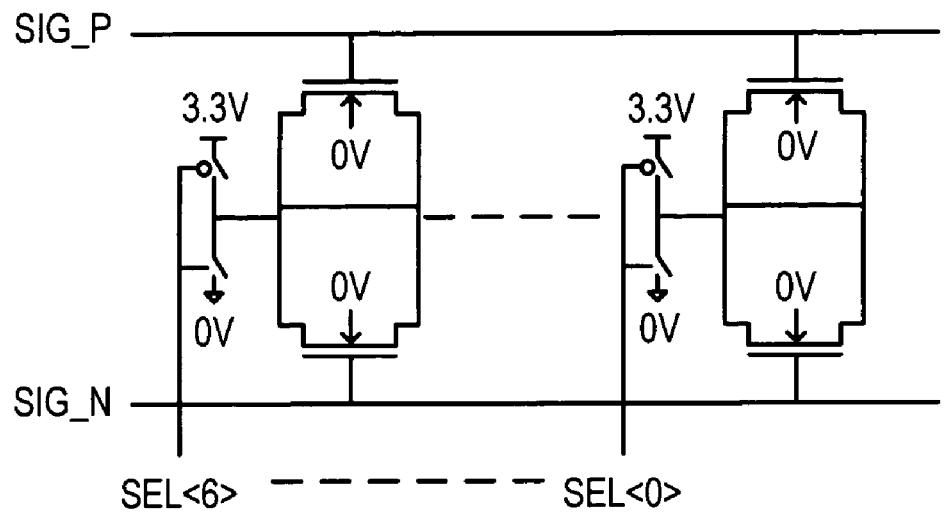
FIG. 26 shows an example implementation of switched NMOS capacitors in the feed-forward signal path.
Figure 27:
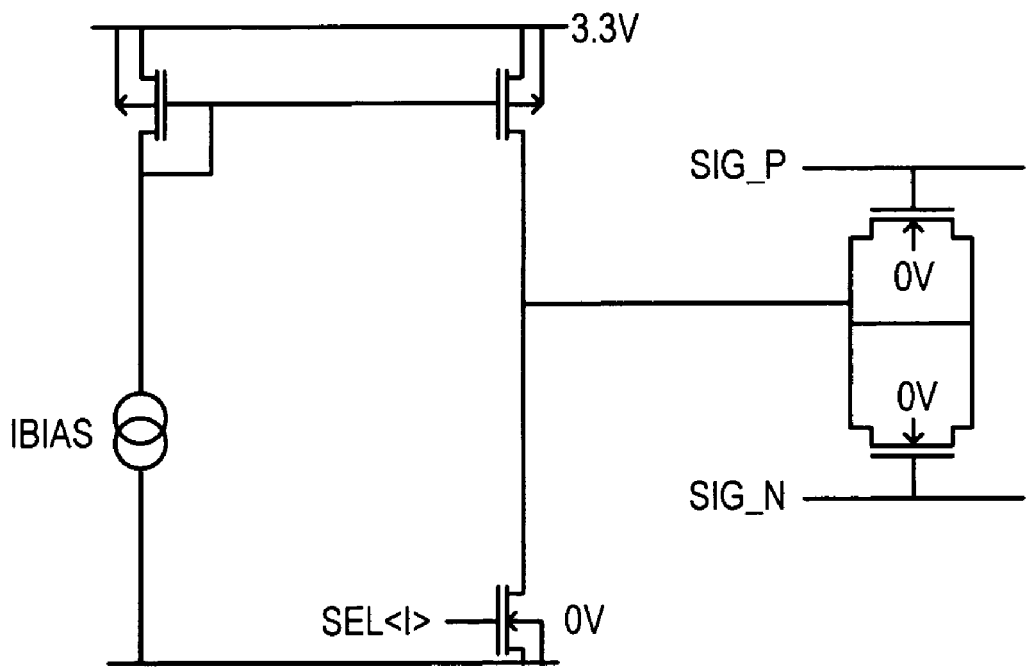
FIG. 27 shows an example circuit for an active inverter and capacitor.
Figure 28:
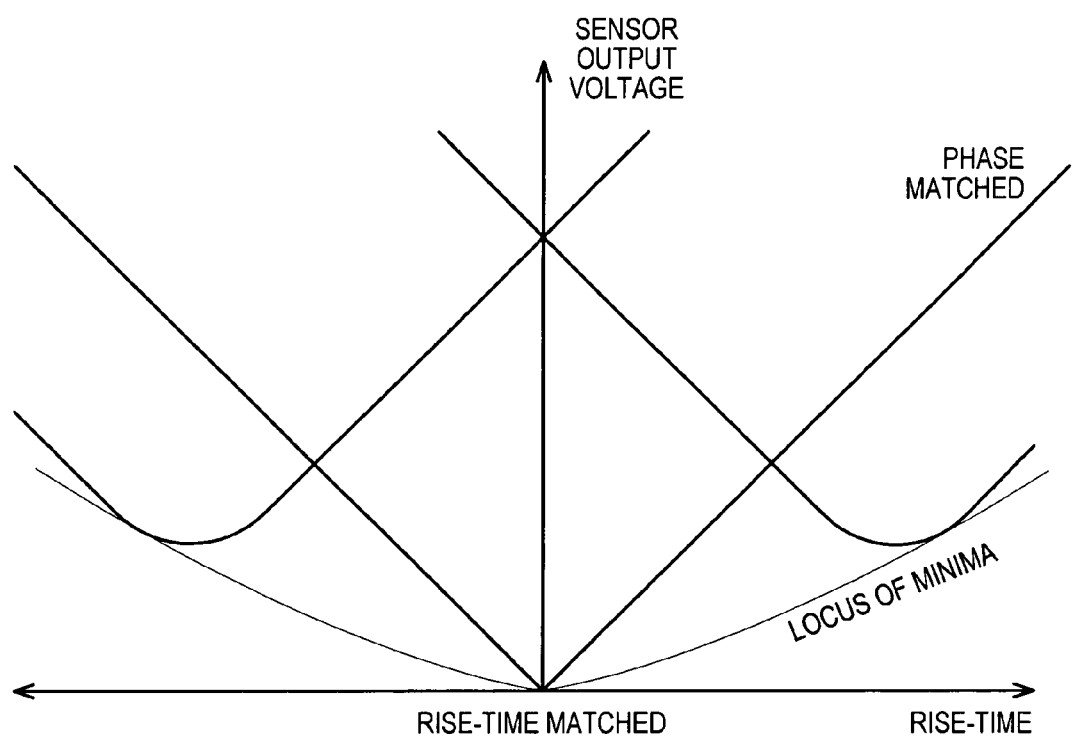
FIG. 28 shows output of phase sensor for matched amplitude, varying rise-time and phase.

Differential capacitance is added to the feed-forward signal path through a series of switched NMOS transistors as shown in the example implementation in FIG. 26. Many other implementations of switches and capacitors are possible. One implementation would be to use binary weighted capacitors and drive switches directly without further decoding. The solution presented here is to use seven equaly sized capacitors and a decoder to generate the seven signals to drive the seven switches.

The capacitors in the implementation shown in FIG. 26 are formed by NMOS transistors. The gate of the NMOS transistor is connected to the signal line while the source and drain are connected to either the most positive supply or ground through the action of the digital control signal.

Active inverters formed with a PMOS current source to the most positive supply and an NMOS switch connected to ground. While the control signal is low, the current source pulls up the drain and source connections of the NMOS transistor/capacitor, resulting in a low capacitance. When the control signal is high the NMOS switch is of sufficient size as to sink the current form the PMOS current source and pull down the drain and source connections of the NMOS transistor/capacitor, resulting in a higher capacitance.

It should be noted that the switches provide bias to the NMOS transistor/capacitors and that the switch resistance does not appear in series with the NMOS transistor/capacitor.

In this design there are 7 identical capacitors connected to the feed-forward signals at the input to the RX part of the bidirectional port. The gate of each pair of NMOS transistors is connected to the differential feed-forward signals. The drain and sources of the NMOS transistors are connected to an active inverter capable of forcing the source/drain connections to either V33 or VSS (3.3V or 0V respectively).

Three logic control bits are decoded in a thermometer decoder to give seven output lines each driving an active inverter. Table 3 shows the relationship between the control logic input signals CTRL[14:12], the outputs of the thermometer decoder SEL[6:0], the capacitance and the rise-time.

TABLE 3

Rise-time Control Truth Table

| CTRL BITS CTRL [14:12] | | | THERM_DECODE output bits SEL[6:0] | | | | | | | Capacitance | Rise-time |
|---|---|---|---|---|---|---|---|---|---|---|---|
| 14 | 13 | 12 | 6 | 5 | 4 | 3 | 2 | 1 | 0 | | |
| 0 | 0 | 0 | 1 | 1 | 1 | 1 | 1 | 1 | 1 | Maximum | Slowest |
| 0 | 0 | 1 | 1 | 1 | 1 | 1 | 1 | 1 | 0 | | |
| 0 | 1 | 0 | 1 | 1 | 1 | 1 | 1 | 0 | 0 | | |
| 0 | 1 | 1 | 1 | 1 | 1 | 1 | 0 | 0 | 0 | | |
| 1 | 0 | 0 | 1 | 1 | 1 | 0 | 0 | 0 | 0 | | |
| 1 | 0 | 1 | 1 | 1 | 0 | 0 | 0 | 0 | 0 | | |
| 1 | 1 | 0 | 1 | 0 | 0 | 0 | 0 | 0 | 0 | | |
| 1 | 1 | 1 | 0 | 0 | 0 | 0 | 0 | 0 | 0 | Minimum | Fastest |

Algorithm Update to Include Rise Time Control

An investigation into the effect of mismatch in the rise-time between the feed-forward and propagated signals indicates that there is no significant effect on the amplitude sensor. That is the error signal from the amplitude sensor passes through zero when the amplitude of the feed-forward signal matches the amplitude of the propagated signal, irrespective of the phase or rise-time mismatch. Although the phase-cancellation sensor described in FIG. 6 shows a rectifier 51 and integrator 52 it should be obvious to those versed in the art that the practical implementation of such a circuit will not produce a sensor which can determine rise-time mismatch. An ideal absolute circuit followed by an ideal integrator will not distinguish between phase and rise-time mismatch. The preferred embodiment described in FIG. 8b produces a sensor that is capable of acting as a phase cancellation sensor and a rise-time cancellation sensor, allowing determination of the phase and rise-time matching points.

The phase-cancellation sensor does not produce an absolute output but rather a minimum voltage when the two signals are in phase. The effect of rise-time mismatch will be to reduce the depth of the null in the phase sensor transfer function as well as shift the transfer function curve along the x-axis. Accordingly finding the null in the phase matching algorithm may not be the point of phase matching. The algorithm must now iterate both phase and rise-time to find the lowest null in the output voltage of the phase sensor. Essentially there are two variables which have to be searched to find the overall minimum. Although the preferred embodiment only has been described in detail, it should be understood that various changes, substitutions and alterations can be made therein without departing from the spirit and scope of the invention as defined by the appended claims.

We claim:

1. An integrated circuit, comprising:
   a transmitter including a transmitter buffer input, wherein the transmitter is configured to transmit a first signal;
   a receiver including a receiver buffer output;
   a differential buffer coupled between the transmitter buffer input and the receiver buffer output, wherein the differential buffer is configured to accept a second signal from the transmitter buffer input and to adjust the second signal in phase and amplitude to reduce the first signal at the receiver buffer output; and
   a training circuit configured to set phase and gain characteristics of the differential buffer by determination of which phase and amplitude characteristics reduce peak-to-peak noise at the receiver buffer output in response to introduction of a training signal to the transmitter and wherein the training circuit further comprises:
   one or more analog-to-digital converters coupled between the finite state machine and the differential buffer; and
   a peak detector coupled to the receiver buffer output, and
   a finite state machine coupled to the peak detector and configured to vary the gain characteristics of the differential buffer by reading a parameter from the peak detector, via the analog-to-digital converters, and is configured to set a value on the analog-to-digital converters to control one or more variable current sources of the differential buffer based, at least in part, on the read parameter.

2. The integrated circuit of claim 1, wherein differential buffer is further configured to adjust a rise time of the second signal.

3. The integrated circuit of claim 1, wherein the finite state machine of the training circuit is configured to use a training pattern to vary the phase and amplitude characteristics of the differential buffer subsequent to a power-up or in response to a request.

4. The integrated circuit of claim 1, wherein the differential buffer comprises a chain of buffer stages.

5. The integrated circuit of claim 1, wherein the differential buffer includes a variable current source to enable control of the amplitude or phase characteristics of the differential buffer.

6. The integrated circuit of claim 1, wherein the training circuit is configured to set a programmable or variable load of the differential buffer to set the amplitude or phase characteristics of the differential buffer.

7. The integrated circuit of claim 1, wherein the differential buffer includes a coarse delay circuit, a fine delay circuit, an amplitude control circuit, and a rise-time control circuit, and wherein the training circuit is configured to control the coarse delay circuit, the fine delay circuit, the amplitude control circuit, and the rise-time control circuit to set the phase and amplitude characteristics of the differential buffer to adjust the second signal in phase and amplitude and to cancel a signal echo component of a third signal at the receiver buffer output.

8. The integrated circuit of claim 7, wherein the coarse delay circuit comprises a digital delay line, a pair of multiplexers, and logic to control the multiplexers.

9. The integrated circuit of claim 8, wherein the digital delay line comprises a cascade of buffers.

10. The integrated circuit of claim 8, further comprising a pair of multiplexers configured to select signals from the digital delay line.

11. The integrated circuit of claim 8, wherein the training circuit is configured to generate control signals to be used to select signals from the digital delay line in the coarse delay circuit to vary a delay of the second signal through the differential buffer.

12. The integrated circuit of claim 7, wherein the amplitude control circuit comprises a buffer with a variable load.

13. The integrated circuit of claim 12, wherein the training circuit is configured to control a gate voltage of an NMOS transistor to vary the variable load.

14. The integrated circuit of claim 7, wherein the rise-time control circuit comprises switches, capacitors, and control logic.

15. The integrated circuit of claim 7, wherein the training circuit is configured to generate control signals for the rise-time control circuit to vary a rise-time of the second signal.

16. The integrated circuit of claim 1, wherein the training circuit is configured to vary the phase and amplitude characteristics of the differential buffer as part of a calibration procedure initiated following power-up or on request.

17. The integrated circuit of claim 1, wherein the one or more analog-to-digital converters are configured to provide a control voltage to the differential buffer to vary the amplitude of the second signal.

18. The integrated circuit of claim 1, wherein the peak detector comprises an amplitude cancellation sensor, a phase cancellation sensor, and an analog multiplexer.

19. The integrated circuit of claim 18, wherein the finite state machine is configured to adjust another amplitude and/or another phase characteristic of another integrated circuit during a calibration phase.

20. The integrated circuit of claim 18, wherein the amplitude cancellation sensor comprises an integrator and a sample-and-hold device.

21. The integrated circuit of claim 20, wherein the integrator is configured to cycle through a reset phase, an integration phase, and a transfer phase.

22. The integrated circuit of claim 18, wherein the phase cancellation sensor is configured to cycle through a reset phase, an integration phase, and a transfer phase during a calibration phase.

23. The integrated circuit of claim 22, wherein the finite state machine is configured to control timing of the reset, integration, and transfer phases.

24. The integrated circuit of claim 18, wherein the finite state machine is further configured to inject patterns into the transmitter and to measure a resulting offset in the amplitude cancellation sensor.

25. The integrated circuit of claim 18, wherein the phase cancellation sensor comprises a full-wave rectifier plus integrator and a sample-and-hold circuit.

26. The integrated circuit of claim 25, wherein the finite state machine is configured to control timing of phases for the phase cancellation sensor.

27. The integrated circuit of claim 1, wherein the differential buffer is configured to reduce the first signal at the receiver buffer output through a complete cancellation of the first signal at the receiver buffer output.

28. A method for operating an integrated circuit comprising:
    transmitting a first signal from an output buffer of a transmitter of the integrated circuit to another circuit, wherein the first signal is also coupled into an input buffer of a receiver of the integrated circuit;
    receiving a second signal from the other circuit;
    transmitting a third signal from an input buffer of the transmitter through a differential buffer;
    adjusting, via the differential buffer, the third signal in phase and amplitude; and
    coupling the adjusted third signal into the output buffer of the receiver to cancel a signal echo component of the second signal;
    setting, by a training circuit, phase and gain characteristics of the differential buffer by determination of which phase and amplitude characteristics reduce peak-to-peak noise at the receiver buffer output in response to introduction of a training signal to the transmitter, wherein the setting further comprises:
        varying phase and gain characteristics of the differential buffer by reading a parameter from a peak detector of the training circuit; and
        setting a value on an analog-to-digital converters of the training circuit to control one or more variable current sources of the differential buffer based at least in part on the parameter.

29. The method of claim 28, wherein a third phase of the third signal is opposite to a first phase of the first signal.

30. The method of claim 28, wherein a third rise time of the third signal is adjusted to match a first rise time of the first signal.

31. The method of claim 28, wherein the training signal comprises a training pattern.

32. The method of claim 31, wherein said setting further comprises:
    varying a digital-to-analog code being applied to the digital-to-analog converter;
    measuring resulting noise conditions at an output buffer of the, wherein the noise conditions correspond to each applied digital-to-analog code;
    determining a particular digital-to-analog code that corresponds to a reduced noise condition; and
    applying the determined particular digital-to-analog code to the digital-to-analog converter.

33. The method of claim 32, wherein said reduced noise condition includes a minimized noise condition.

34. An integrated circuit, comprising:
    a transmitter configured to transmit a first signal to another integrated circuit, wherein the transmitter has a transmitter buffer including a transmitter buffer output and a transmitter buffer input;
    a receiver configured to receive a second signal from the other integrated circuit, wherein the receiver has a receiver buffer including a receiver buffer output and a receiver buffer input, and wherein the receiver buffer input is coupled to the transmitter buffer output;
    a differential buffer coupled between the transmitter buffer input and the receiver buffer output, wherein the differential buffer is configured to accept a third signal from the transmitter buffer input and to adjust the third signal in phase and amplitude to cancel the first signal at the receiver buffer output; and
    a training circuit, including a finite state machine located on the integrated circuit, configured to set phase and amplitude characteristics of the differential buffer by determination of which phase and amplitude characteristics minimize peak-to-peak noise at the receiver buffer output in response to introduction of a training signal to the transmitter;
    wherein the training circuit further comprises:
    one or more analog-to-digital converters coupled between the finite state machine and the differential buffer; and
    a peak detector coupled between the finite state machine and the receiver buffer output, and wherein the finite state machine is configured to vary gain and phase characteristics of the differential buffer by reading a parameter from the peak detector, via the analog-to-digital converters, and is configured to set a value on the analog-to-digital converters to control one or more variable current sources of the differential buffer based, at least in part, on the read parameter.

35. The integrated circuit of claim 34, wherein the differential buffer is configured to cancel the first signal at the receiver buffer output through a complete cancellation of the first signal at the receiver buffer output.

* * * * *

UNITED STATES PATENT AND TRADEMARK OFFICE
CERTIFICATE OF CORRECTION

PATENT NO. : 7,702,004 B2
APPLICATION NO. : 10/730055
DATED : April 20, 2010
INVENTOR(S) : Alexander R. Deas, Igor A. Abrosimov and David Coyne It is certified that error appears in the above-identified patent and that said Letters Patent is hereby corrected as shown below:

Column 20

Line 13, "setting a value on an analog-to-digital converters of the" should read --setting a value on an analog-to-digital converter of the--

Column 20

Lines 29-30, "at an output buffer of the, wherein" should read --at an output buffer, wherein--

Signed and Sealed this

Twenty-ninth Day of June, 2010

David J. Kappos
*Director of the United States Patent and Trademark Office*